(12) United States Patent
Greenbank et al.

(10) Patent No.: US 12,076,687 B2
(45) Date of Patent: Sep. 3, 2024

(54) SORBENT DEVICES FOR AIR INTAKES

(71) Applicant: CALGON CARBON CORPORATION, Moon Township, PA (US)

(72) Inventors: Michael Greenbank, Monaca, PA (US); Matthew Adomaitis, Moon Township, PA (US); Scott Mutschler, Moon Township, PA (US)

(73) Assignee: CALGON CARBON CORPORATION, Moon Township, PA (US)

( * ) Notice: Subject to any disclaimer, the term of this patent is extended or adjusted under 35 U.S.C. 154(b) by 419 days.

(21) Appl. No.: 16/989,542

(22) Filed: Aug. 10, 2020

(65) Prior Publication Data

US 2021/0039037 A1 Feb. 11, 2021

Related U.S. Application Data

(60) Provisional application No. 62/884,458, filed on Aug. 8, 2019.

(51) Int. Cl.
*F02M 25/08* (2006.01)
*B01D 53/04* (2006.01)
(Continued)

(52) U.S. Cl.
CPC .......... *B01D 53/0407* (2013.01); *B01J 20/20* (2013.01); *B01J 20/2803* (2013.01);
(Continued)

(58) Field of Classification Search
CPC .... B01D 53/02; B01D 53/04; B01D 53/0407; B01D 2253/102; B01D 2253/25;
(Continued)

(56) References Cited

U.S. PATENT DOCUMENTS

| | | |
|---|---|---|
| 2,038,071 A | 4/1936 | Wilhelm |
| 3,164,452 A | 1/1965 | Westeren |

(Continued)

FOREIGN PATENT DOCUMENTS

| | | |
|---|---|---|
| EP | 0433677 A1 | 6/1991 |
| EP | 1413348 A1 | 4/2004 |

(Continued)

OTHER PUBLICATIONS

Raposo et al., Mercury Speciation in Fluorescent Lamps by Thermal Release Analysis (2003), Waste Management 23(10):879-886.

(Continued)

*Primary Examiner* — Frank M Lawrence, Jr.
(74) *Attorney, Agent, or Firm* — DLA Piper LLP (US)

(57) ABSTRACT

Sorbent material sheets products that include sorbent material sheets and at least one porous cover layer are attached to an inner wall surface that is defined by an air intake. The sorbent material sheets collect vapors such as hydrocarbon vapors from engine components such as the combustion chamber, injectors, carburetor, fuel ports, crankcase, or other engine components, thereby reducing evaporative emissions. In certain configurations, the sorbent material sheet product includes an edge seal that improves the handling of the sorbent material sheets during the manufacturing process.

20 Claims, 5 Drawing Sheets

(51) Int. Cl.
*B01J 20/20* (2006.01)
*B01J 20/28* (2006.01)
*B01J 20/30* (2006.01)

(52) U.S. Cl.
CPC ..... *B01J 20/28035* (2013.01); *B01J 20/2804* (2013.01); *B01J 20/3042* (2013.01); *F02M 25/0854* (2013.01); *B01D 2253/102* (2013.01); *B01D 2257/702* (2013.01); *B01D 2259/40086* (2013.01); *B01D 2259/4516* (2013.01); *B01D 2259/4566* (2013.01)

(58) Field of Classification Search
CPC .......... B01D 2257/702; B01D 2258/01; B01D 2259/40086; B01D 2259/4516; B01D 2259/4566; B01J 20/20; B01J 20/2803; B01J 20/28035; B01J 20/2804; B01J 20/3042; B02M 25/0854; B02M 25/08
USPC ............ 95/146; 96/134, 135, 147, 153, 154; 123/518, 519
See application file for complete search history.

(56) References Cited

U.S. PATENT DOCUMENTS

| | | |
|---|---|---|
| 3,713,281 A | 1/1973 | Asker et al. |
| 3,730,158 A | 5/1973 | St. Amand |
| 3,757,488 A | 9/1973 | Austin et al. |
| 3,867,111 A | 2/1975 | Knowles |
| 4,331,639 A | 5/1982 | Hass et al. |
| 4,338,101 A | 7/1982 | Tuttle |
| 4,343,629 A | 8/1982 | Dinsmore et al. |
| 4,418,662 A | 12/1983 | Engler et al. |
| 4,444,727 A | 4/1984 | Yanagihara et al. |
| 5,016,628 A | 5/1991 | Lambert |
| 5,021,071 A | 6/1991 | Reddy |
| 5,064,805 A | 11/1991 | Otowa |
| 5,194,414 A | 3/1993 | Kuma |
| 5,207,734 A | 5/1993 | Day et al. |
| 5,310,593 A | 5/1994 | Tsujimoto et al. |
| 5,322,778 A | 6/1994 | Antrim et al. |
| 5,348,755 A | 9/1994 | Roy |
| 5,352,274 A | 10/1994 | Blakley |
| 5,500,038 A | 3/1996 | Dauber et al. |
| 5,598,721 A | 2/1997 | Rockenfeller et al. |
| 5,658,369 A | 8/1997 | Kusay |
| 5,713,881 A | 2/1998 | Rezai et al. |
| 5,726,118 A | 3/1998 | Ivey et al. |
| 5,754,002 A | 5/1998 | Haitko et al. |
| 5,820,644 A | 10/1998 | Mori et al. |
| 5,821,682 A | 10/1998 | Foust et al. |
| 5,861,050 A | 1/1999 | Pittel et al. |
| 5,871,568 A | 2/1999 | Gibson |
| 5,897,779 A | 4/1999 | Wisted et al. |
| 5,952,420 A | 9/1999 | Senkus et al. |
| 5,964,221 A | 10/1999 | McKenna |
| 6,047,687 A | 4/2000 | Ishikawa et al. |
| 6,146,451 A | 11/2000 | Sakata et al. |
| 6,176,897 B1 | 1/2001 | Keefer |
| 6,186,939 B1 | 2/2001 | Forrester |
| 6,261,345 B1 | 7/2001 | Miyano et al. |
| 6,280,824 B1 | 8/2001 | Insley et al. |
| 6,342,129 B1 | 1/2002 | Vaughn et al. |
| 6,406,523 B1 | 6/2002 | Connor et al. |
| 6,472,343 B1 | 10/2002 | McCrae et al. |
| 6,540,815 B1* | 4/2003 | Hiltzik ............... F02M 25/0854 95/146 |
| 6,599,856 B1 | 7/2003 | Uchino et al. |
| 6,652,627 B1 | 11/2003 | Tonkovich et al. |
| 6,699,393 B2 | 3/2004 | Baker et al. |
| 6,706,194 B2 | 3/2004 | Baker et al. |
| 6,848,374 B2 | 2/2005 | Srinivasachar et al. |
| RE38,844 E | 10/2005 | Hiltzik et al. |
| 7,077,891 B2 | 7/2006 | Jaffe et al. |
| 7,132,007 B1 | 11/2006 | Von Blücher et al. |
| 7,222,612 B2 | 5/2007 | Hagler et al. |
| 7,278,406 B2 | 10/2007 | Hagler |
| 7,326,278 B2 | 2/2008 | Butters et al. |
| 7,531,029 B2 | 5/2009 | Hoke et al. |
| 7,547,350 B2 | 6/2009 | Callahan et al. |
| 7,578,285 B2 | 8/2009 | Buelow et al. |
| 7,666,507 B2 | 2/2010 | Ishikawa et al. |
| 7,704,305 B2 | 4/2010 | Nishida |
| 7,708,817 B2* | 5/2010 | Hurley ................ F02M 35/046 96/153 |
| 7,744,677 B2 | 6/2010 | Barclay et al. |
| 7,780,765 B2 | 8/2010 | Srinivasachar et al. |
| 7,858,061 B2 | 12/2010 | Varma et al. |
| 7,862,725 B2 | 1/2011 | Mazyck et al. |
| 7,879,136 B2 | 2/2011 | Mazyck |
| 8,034,163 B1 | 10/2011 | Durham et al. |
| 8,042,524 B2 | 10/2011 | Elum et al. |
| 8,057,576 B1 | 11/2011 | Pollack |
| 8,069,797 B2 | 12/2011 | Srinivasachar et al. |
| 8,080,088 B1 | 12/2011 | Srinivasachar |
| 8,168,147 B2 | 5/2012 | Olson et al. |
| 8,262,785 B2 | 9/2012 | Barron et al. |
| 8,263,524 B1 | 9/2012 | Skandan et al. |
| 8,372,477 B2 | 2/2013 | Buelow et al. |
| 8,632,334 B2 | 1/2014 | Knueppel et al. |
| 8,852,322 B2 | 10/2014 | Gupta et al. |
| 8,864,877 B2 | 10/2014 | Nishita et al. |
| 8,888,901 B2 | 11/2014 | Kimoto |
| 9,138,684 B2 | 9/2015 | Li et al. |
| 9,732,649 B2 | 8/2017 | Hiltzik et al. |
| 2002/0124732 A1 | 9/2002 | Hara et al. |
| 2002/0124733 A1* | 9/2002 | Iriyama ............. F02M 35/0203 96/134 |
| 2002/0170436 A1 | 11/2002 | Keefer et al. |
| 2003/0037672 A1 | 2/2003 | Sircar |
| 2003/0116021 A1* | 6/2003 | Oda .................... B01D 53/0415 96/144 |
| 2003/0188663 A1 | 10/2003 | Barthel et al. |
| 2004/0116014 A1 | 6/2004 | Soerens et al. |
| 2004/0118287 A1 | 6/2004 | Jaffe et al. |
| 2004/0118387 A1* | 6/2004 | Lawrence ............. B01D 53/92 123/518 |
| 2004/0197612 A1 | 10/2004 | Keefer et al. |
| 2004/0262217 A1 | 12/2004 | Mori et al. |
| 2005/0081717 A1 | 4/2005 | Meiller et al. |
| 2005/0167367 A1 | 8/2005 | Baker |
| 2005/0172805 A1 | 8/2005 | Motono et al. |
| 2005/0211099 A1 | 9/2005 | Doughty et al. |
| 2005/0241479 A1 | 11/2005 | Lebowitz et al. |
| 2005/0279210 A1 | 12/2005 | Hirata |
| 2006/0032372 A1 | 2/2006 | Dauber et al. |
| 2006/0042467 A1 | 3/2006 | Maru |
| 2006/0054142 A1* | 3/2006 | Burke ............... F02M 35/10268 123/518 |
| 2006/0142154 A1 | 6/2006 | Wolff |
| 2006/0205830 A1 | 9/2006 | Lebowitz et al. |
| 2006/0283996 A1 | 12/2006 | Jensen |
| 2007/0034193 A1 | 2/2007 | King |
| 2007/0101865 A1 | 5/2007 | Kim et al. |
| 2007/0113740 A1* | 5/2007 | Oda .................... B01D 53/0415 96/134 |
| 2007/0169758 A1 | 7/2007 | Mills |
| 2007/0272080 A1 | 11/2007 | Allen et al. |
| 2008/0121142 A1 | 5/2008 | Comrie et al. |
| 2008/0141637 A1* | 6/2008 | Hirata ................ B29C 66/1122 55/497 |
| 2008/0308075 A1 | 12/2008 | Allen et al. |
| 2009/0025553 A1 | 1/2009 | Keefer et al. |
| 2009/0172998 A1 | 7/2009 | Harris et al. |
| 2009/0223370 A1 | 9/2009 | Kosugi et al. |
| 2010/0178624 A1 | 7/2010 | Srinivasachar |
| 2010/0300288 A1 | 12/2010 | Boulet et al. |
| 2010/0316538 A1 | 12/2010 | Buelow et al. |
| 2011/0030592 A1 | 2/2011 | Baldrey et al. |
| 2011/0072974 A1* | 3/2011 | Patel .................. B01D 53/02 96/147 |
| 2011/0100223 A1 | 5/2011 | Tarrant et al. |

(56) References Cited

U.S. PATENT DOCUMENTS

| | | |
|---|---|---|
| 2011/0214572 A1 | 9/2011 | Hasegawa et al. |
| 2012/0048110 A1 | 3/2012 | Dawes et al. |
| 2012/0079926 A1 | 4/2012 | Long et al. |
| 2012/0100054 A1 | 4/2012 | Durham et al. |
| 2013/0078169 A1 | 3/2013 | LaFlesh et al. |
| 2013/0109562 A1 | 5/2013 | Wong et al. |
| 2013/0263741 A1* | 10/2013 | Mani .................. F02M 25/0854 96/112 |
| 2013/0269532 A1 | 10/2013 | Kimoto |
| 2013/0276634 A1 | 10/2013 | McKenna et al. |
| 2013/0330257 A1 | 12/2013 | Tramposch |
| 2014/0117054 A1 | 5/2014 | Ryan et al. |
| 2014/0165542 A1* | 6/2014 | Loftin .................. F01N 3/0807 60/311 |
| 2014/0216261 A1 | 8/2014 | Fleming, Jr. |
| 2014/0295134 A1 | 10/2014 | Wood et al. |
| 2014/0352542 A1 | 12/2014 | Mani |
| 2014/0374655 A1 | 12/2014 | Mimna |
| 2015/0050202 A1 | 2/2015 | Filippelli et al. |
| 2016/0030914 A1* | 2/2016 | Boenkendorf ..... B01J 20/28059 252/189 |
| 2016/0031318 A1 | 2/2016 | Shimokawa |
| 2016/0166972 A1 | 6/2016 | Owens et al. |
| 2016/0271555 A1 | 9/2016 | Hiltzik et al. |
| 2018/0030871 A1 | 2/2018 | Hiltzik et al. |
| 2018/0214816 A1 | 8/2018 | Greenbank |
| 2018/0229217 A1 | 8/2018 | Mazzoccoli et al. |
| 2018/0363594 A1 | 12/2018 | Byrne et al. |
| 2019/0134558 A1 | 5/2019 | Billiet et al. |
| 2019/0247831 A1 | 8/2019 | Tramposch et al. |
| 2019/0262573 A1 | 8/2019 | McKenna et al. |
| 2020/0038798 A1 | 2/2020 | Greenbank et al. |
| 2020/0039809 A1 | 2/2020 | Greenbank et al. |
| 2020/0040851 A1 | 2/2020 | Greenbank et al. |
| 2021/0023532 A1 | 1/2021 | Greenbank et al. |
| 2021/0172402 A1 | 6/2021 | Byrne et al. |
| 2021/0354075 A1 | 11/2021 | Smales et al. |

FOREIGN PATENT DOCUMENTS

| | | |
|---|---|---|
| EP | 1377520 B1 | 3/2014 |
| EP | 2125162 B1 | 7/2014 |
| FR | 3035196 A1 | 10/2016 |
| FR | 3076743 A1 | 7/2019 |
| GB | 1336241 A | 11/1973 |
| JP | S55-107056 A | 8/1980 |
| JP | H04265461 A | 9/1992 |
| JP | H07269421 A | 10/1995 |
| JP | 2001-505813 A | 5/2001 |
| JP | 2004-154652 A | 6/2004 |
| JP | 2006-068588 A | 3/2006 |
| JP | 2008023365 A | 2/2008 |
| JP | 2013188715 A | 9/2013 |
| JP | 2016500784 A | 1/2016 |
| JP | 2018505071 A | 2/2018 |
| KR | 890000460 B1 | 3/1989 |
| KR | 10-1118048 B1 | 2/2012 |
| KR | 2016-0107150 A | 9/2016 |
| WO | 9851397 A1 | 11/1998 |
| WO | 2004089501 A2 | 10/2004 |
| WO | 2010042321 A1 | 4/2010 |
| WO | 2011038415 A2 | 3/2011 |
| WO | 2011127323 A2 | 10/2011 |
| WO | 2013063490 A1 | 5/2013 |
| WO | 2013083992 A1 | 6/2013 |
| WO | 2014082076 A1 | 5/2014 |
| WO | 2014088630 A1 | 6/2014 |
| WO | 2014205200 A1 | 12/2014 |
| WO | 2015/053815 A1 | 4/2015 |
| WO | 2018144588 A1 | 8/2018 |
| WO | 2020028703 A2 | 2/2020 |
| WO | 2020028839 A1 | 2/2020 |
| WO | 2020028845 A1 | 2/2020 |

OTHER PUBLICATIONS

Korea Auto News, "22. Introduction to ORVR (Onboard Refueling Vapor Recovery System) System", Automotive Industry Specialized Portal, Jan. 2018, retrieved from URL:, https://www.korea-autonews.com/entry/ORVROnboard-Refueling (5 total pages).

* cited by examiner

SORBENT DEVICES FOR AIR INTAKES

CROSS REFERENCE TO RELATED APPLICATIONS

This application claims priority to U.S. Provisional Application Ser. No. 62/884,458 filed on Aug. 8, 2019, the content of which is hereby incorporated by reference in its entirety

BACKGROUND

Evaporative emissions from gasoline and other hydrocarbon fuels are a significant source of air pollution because the various hydrocarbons contained in the fuels can form photochemical smog on exposure to sunlight. The compounds of this smog and the hydrocarbons themselves cause degrading health effects in humans and animals as well as environmental damage. Conventionally, these emissions are usually controlled by attaching a sorbent canister to the fuel tank of cars, trucks, and other vehicles. While the engine is not running, the sorbent canister adsorbs excess hydrocarbon emissions from the fuel tank, Conversely, while the engine operates, the canister is purged with fresh air, which is then directed to the air intake of the engine so that the purged fuel vapors can be combusted by the engine.

However, vehicle fuel systems include myriad locations where hydrocarbon vapors can escape and contribute to evaporative emissions. Additionally, tightening hydrocarbon emission limits have been applied by many agencies, such as the Environmental Protection Agency (EPA). These realities mean that new ways of capturing hydrocarbon vapor emissions must be developed. Current efforts are focused on the inclusion of adsorbent materials in the air intake of engines, further reducing the hydrocarbon emissions that would otherwise emanate from the air intake manifold due to its proximity to the combustion chamber and fuel injectors. To date, these have taken the form of a small pouch of granular activated carbon, or of a piece of paper that was made with added powdered activated carbon. The former suffers from concerns around dust generation, increased pressure drop, and poor utilization of the activated carbon in the interior of the pouch. The latter suffers from a fouling of the activated carbon stemming from the paper making process, thereby compromising capacity and kinetics, as well as incurring high cost. There is a need for improved sorbent devices to adsorb and/or absorb hydrocarbon vapors from vehicle air intakes.

SUMMARY

In one embodiment, there is a vapor adsorbing air intake comprising an air intake defining an internal wall surface; a sorbent material sheet product located and positioned along the internal wall surface for interaction with vapors in close proximity thereto. Such arrangements are "flow-over" type devices.

In some embodiments, there is a vapor adsorbing air intake comprising an air intake defining an internal chamber; a sorbent material sheet product located and positioned within the internal chamber to allow interaction with vapors as they flow through the sorbent material sheet product. Such arrangements are "flow-through" type devices. These sorbent material sheet products may be in the form of a rolled sorbent material sheet or stacked sorbent material sheets.

In one embodiment, there is a vapor adsorbing air intake comprising an air intake defining an internal wall surface; a sorbent material sheet product that includes a sorbent material sheet and at least one porous cover layer, wherein the sorbent material sheet product is located and positioned along the internal wall surface for interaction with vapors in close proximity thereto.

In another embodiment, the sorbent material that includes a carbonaceous material.

In another embodiment, the carbonaceous material is selected from the group consisting of activated carbon, reactivated carbon, carbon nanotubes, graphenes, and combinations thereof.

In another embodiment, the carbonaceous material is activated carbon or reactivated carbon.

In another embodiment, the sorbent material sheet comprises a sorbent material and a binder, wherein the binder comprises polytetrafluoroethylenes (PTFE or TEFLON), polyvinylidene fluorides (PVF2 or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, or copolymers or combinations thereof.

In another embodiment, each of the at least one porous cover layer comprises polytetrafluoroethylenes (PTFE or TEFLON), polyvinylidene fluorides (PVF2 or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, or copolymers or combinations thereof.

In another embodiment, the porous cover layer is in the form of non-woven fibers.

In another embodiment, the vapor adsorbing air intake is at least one of an air filter box or air filter housing, an air intake tube, a mass air flow sensor, a throttle body, an air intake manifold, an air intake runner that is connected to an individual cylinder or combustion chamber, or an air intake runner that is connected to multiple cylinders or combustion chambers.

In another embodiment, the sorbent material sheet has an edge seal that is disposed on one or more of a perimeter of the sorbent material sheet or proximal to an attachment of the sorbent material sheet to the internal wall surface of the air intake.

In another embodiment, the edge seal has an edge seal width of about 1 mm to about 10 mm.

In another embodiment, the edge seal has an edge seal width of about 2.5 mm to about 5 mm.

In another embodiment, the edge seal is formed by, on one or more portions of the one or more porous cover layer, at least one of localized heating by infrared radiation, ultrasonic vibration, or contact with a heated tool, localized curing or localized crosslinking by ultraviolet radiation or oxidizing or free radical compounds, localized application of adhesive or binder, or mechanical fastening by at least one of stitches, folds, staples, or clamps.

In one embodiment, there is a sorbent material sheet product comprising at least one sorbent material sheet and at least one porous cover layer that is disposed on the at least one sorbent material sheet, wherein the sorbent material sheet product has an edge seal disposed on one or more of a perimeter of the sorbent material sheet or is proximal to an attachment for attaching the sorbent material sheet to the internal wall surface of a vapor adsorbing air intake.

In another embodiment, the edge seal has an edge seal width of about 1 mm to about 10 mm.

In another embodiment, wherein the edge seal has an edge seal width of about 2.5 mm to about 5 mm.

In one embodiment, there is a method of making a sorbent material sheet product, the method comprising blending a binder and a sorbent material; forming at least one sorbent material sheet from the blend of the binder and the sorbent material; providing an attachment on the sorbent material sheet for attaching the sorbent material sheet to an internal wall surface of a vapor adsorbing air intake; providing a porous cover layer on the at least one sorbent material sheet; forming an edge seal that is disposed on one or more of a perimeter of the sorbent material sheet product or is proximal to an attachment for attaching the sorbent material sheet to the internal wall surface of a vapor adsorbing air intake.

In another embodiment, the edge seal is formed by localized heating by infrared radiation, ultrasonic vibration, or contact with a heated tool; localized curing or localized crosslinking by ultraviolet radiation or oxidizing or free radical compounds; localized application of adhesive, binder, tackifier, or primer; mechanical fastening by at least one of stitches, folds, staples, or clamps; and combinations of two or more of the preceding steps.

In one embodiment, there is a method of capturing vapors in a vapor adsorbing air intake, the method comprising: providing an air intake defining an internal wall surface and a sorbent material sheet product that includes a sorbent material sheet and at least one porous cover layer located and positioned along the internal wall surface; permitting vapors to contact the sorbent material sheet product and thereby be adsorbed by the sorbent material sheet product.

In another embodiment, the method further comprises desorbing the vapors that were previously adsorbed by the sorbent material sheet product by contacting the sorbent material sheet product with a purging gas.

In one embodiment, there is a vapor adsorbing air intake comprising an air intake defining an internal wall surface; a sorbent material sheet that includes a sorbent material and a binder, wherein the binder is polytetrafluoroethylenes (PTFE or TEFLON), polyvinylidene fluorides (PVF2 or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, or copolymers or combinations thereof, and wherein the sorbent material sheet is located and positioned along the internal wall surface for interaction with vapors in close proximity thereto.

DETAILED DESCRIPTION

Figure 1:
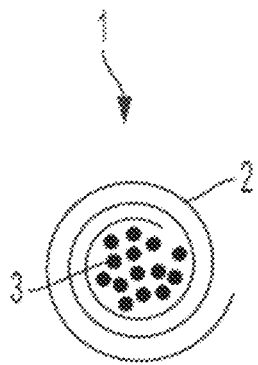
FIG. 1 depicts one embodiment of the invention utilizing a sorbent core.

Before the present compositions and methods are described, it is to be understood that this invention is not limited to the particular processes, compositions, or methodologies described, as these may vary. It is also to be understood that the terminology used in the description is for the purpose of describing the particular versions or embodiments only, and is not intended to limit the scope of the present invention, which will be limited only by the appended claims. Unless defined otherwise, all technical and scientific terms used herein have the same meaning as commonly understood by one of ordinary skill in the art. Although any methods and materials similar or equivalent to those described herein can be used in the practice or testing of embodiments of the present invention, the preferred methods, devices, and materials are now described. All publications mentioned herein are incorporated by reference in their entirety. Nothing herein is to be construed as an admission that the invention is not entitled to antedate such disclosure by virtue of prior invention.

It must also be noted that as used herein and in the appended claims, the singular forms "a," "an," and "the" include plural reference unless the context clearly dictates otherwise. Thus, for example, reference to "a combustion chamber" is a reference to "one or more combustion chambers" and equivalents thereof known to those skilled in the art, and so forth.

As used herein, the term "about" means plus or minus 10% of the numerical value of the number with which it is being used. Therefore, about 50% means in the range of 45%-55%.

As used herein, the term "sorbent material" is meant to encompass all known materials from any source that are capable of absorbing or adsorbing liquids and/or gases. For example, sorbent materials include, but are not limited to, carbonaceous materials such as activated carbon, reactivated carbon, carbon nanotubes, or graphenes. Other sorbent materials that are not carbonaceous materials include natural and synthetic zeolite, silica, silica gel, alumina, zirconia, and diatomaceous earths. In a certain embodiment the sorbent material is activated carbon.

As used herein, descriptions and claims of multiple sorbent material sheets mean that there are multiple, separated sheets, with sides and/or surfaces in proximity to each other. Alternatively, descriptions and claims of multiple sorbent material sheets mean that there is only a single sheet, but that it has been wound or folded over on itself to yield a stacked, wound, or otherwise constructed mass of sheets with sides and/or surfaces in proximity to each other. The term also envisions that multiple sheets are stacked together and then wound or otherwise folded over, forming alternating layers in a single mass.

As used in the context of the sorbent or sorbent material or sorbent material sheets, the term surface means the outer boundary of that individual component. Even more specifically, in the context of the sorbent material sheets, the term surface means the largest planar faces of the sheets, which when rolled or stacked face each other or themselves. In a sheet, the surface is the portion that is significantly larger than the thickness of the sheet.

Embodiments of the invention are directed to devices containing one or more sheets of sorbent material, sorbent material sheets, and methods for making sorbent material sheets and devices containing these sheets. In various embodiments, the sorbent material sheets may be composed of a sorbent material and a binder and have a thickness of less than about 2 mm, or less than about 1 mm The devices of various embodiments may include a housing and one or more sorbent material sheets. In some embodiments, the devices may have a void fraction of about 10% or more of the total volume of the housing.

A sheet form of activated carbon can be produced with activated carbon contents of about 80% to about 90% or more by weight by use of particular, fibrillating binders. Furthermore, the activated carbon is not fouled (i.e. its pores are not blocked and its capacity is not reduced) by said binder, thereby affording far greater capacity and faster kinetics vs. the use of traditional paper making technology. The flexibility of the sheet allows for very wide design flexibility, allowing flow-through as well as flow-by designs of varying pressure drop and capacity as needed. Exemplary sheets are described below. Said sheets are amenable to being laminated with a variety of other materials that will not bind the sheet, that facilitate attachment of the sheet within the manifold (e.g. by sonic welding or heat-staking), and that eliminate any concerns about fugitive dust.

The Sorbent Material Sheets

The sorbent material sheets of the invention may include any of the sorbent materials described above including, but are not limited to, carbonaceous materials such as activated carbon, carbon nanotubes, or graphenes. Other sorbent materials that are not carbonaceous materials include natural and synthetic zeolite, silica, silica gel, alumina, zirconia, and diatomaceous earths. In a certain embodiment, the sorbent material sheets include activated carbon. The sorbents may be used alone or in combination.

The activated carbon may be of various grades and types selected based on performance requirements, cost, and other considerations. The activated carbon may be granular from reagglomerating a powder, granular from crushing or sizing nutshells, wood, coal or pellets created by extrusion, or activated carbon in powdered form. The activated carbon may be formed by processes of carbonization and activated. The raw material, such as wood, nutshell, coal, pitch, coconut, etc. is oxidized and devolatilized, and/or carbon dioxide gasified and activated with steam to form the pore structure in the activated carbon which is useful for adsorption. The initial oxidation and devolatilization process may include a chemical treatment with a dehydrating chemical, such as phosphoric acid, sulfuric acid, sodium hydroxide, potassium hydroxide, and combinations of those.

A variety of activation processes are known in the art. The most useful processes for providing activated carbon for the sorbent material sheets of the claimed invention involve a step of providing wood and/or wood byproduct, acid treating the wood and/or wood byproducts by exposure to phosphoric acid, and carbonizing the wood and/or wood byproducts using steam and/or carbon dioxide gasification. This process results in activated carbon particles having the highest butane working capacity ("BWC"), which is a measure of activated carbon performance.

The activated carbon may be formed from materials including bagasse, bamboo, coconut husks, peat, wood such as hardwood and softwood sources in the form of sawdust and scrap, lignite, synthetic polymers, coal and coal tar, petroleum pitch, asphalt and bitumen, corn stalks and husks, wheat straw, spent grains, rice hulls and husks, nutshells, and combinations thereof.

The sorbent material sheets may further include one or more binders. Embodiments are not limited to particular binders, which can include polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers such as perfluoroelastomers (FFKM) and tetrafluoro ethylene/propylene rubbers (FEPM), aramid polymers such as para-aramid and meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof. The binders can be thermoplastic or thermosetting as conditions require, and can include mixtures of thermoplastic and thermosetting compounds.

The form of the one or more binders includes one or more of a liquid binder that has some associated viscosity or rheological characteristics, elongated fibers that are woven or nonwoven, or particles. In some embodiments, the binder includes multiple of the above physical forms which are blended together so that the resulting blend is substantially homogenous.

The amount of binder may be about 1% to about 40% by weight of the total composition, and in certain embodiments, the amount of binder may be about 1% to about 20% by weight or about 2% to about 10% by weight of the total composition, or any individual amount or range encompassing these example amounts. The binder may be present in the amount of about 1%, about 2%, about 3%, about 4%, about 5%, about 6%, about 7%, about 8%, about 9%, about 10%, about 11%, about 12%, about 13%, about 14%, about 15%, about 16%, about 17%, about 18%, about 19%, about 20% or any range made of any two or more of the above amounts, all of which are measured by weight of the total composition. In some embodiments, the sorbent material sheets may include a solvent, which may generally be present in small, residual, amounts of, for example, less than 10%, less than 5%, or less than 2% and greater than about 0.1% or 0.2% by weight. In particular, in some embodiments the sorbent material sheets may have no (0%) solvent.

In some embodiments, the sorbent material sheets have a thickness of less than about 3 mm, less than about 2.8 mm, less than about 2.6 mm, less than about 2.4 mm, less than about 2.2 mm, less than about 2.0 mm, less than about 1.8 mm, less than about 1.6 mm, less than about 1.4 mm, less than about 1.2 mm, less than about 1.0 mm, about 0.01 mm to about 2 mm, about 0.01 mm to about 1.8 mm, about 0.1 mm to about 1.6 mm, about 0.01 mm to about 1.4 mm, about 0.01 mm to about 1.2 mm, about 0.01 mm to about 1.0 mm, about 0.02 mm to about 0.90 mm, about 0.05 to about 0.95 mm, about 0.05 to about 0.90 mm or any individual thickness or range encompassed by these example ranges. The sorbent material sheets of various embodiments may have a density of about 0.05 g/cm$^3$ to about 2.0 g/cm$^3$, and in other embodiments, the sorbent material sheets may have a density of 0.08 g/cm$^3$ to about 1.5 g/cm$^3$, about 0.1 g/cm$^3$ to about 1.3 g/cm$^3$, or any density or range encompassed by these example ranges. The density is calculated first by measuring the thickness of a given square or circular piece of sheet with a micrometer, multiplying by the surface area to obtain the volume, and weighing the piece to obtain the density (weight/volume).

The BWC for each sorbent material sheet may be greater than about 7 g/100 cm$^3$, and in some embodiments, the BWC may be from about 7.0 g/100 cm$^3$ to about 30 g/100 cm$^3$, about 8.0 g/100 cm$^3$ to about 25 g/100 cm$^3$, about 10 g/100 cm$^3$ to about 20 g/100 cm$^3$, about 10 g/100 cm$^3$ to about 15 g/100 cm$^3$, about 11 g/100 cm$^3$ to about 15 g/100 cm$^3$, about 12 g/100 cm$^3$ to about 15 g/100 cm$^3$ or any individual BWC or range encompassed by these example ranges. In other examples, the BWC may be about 9 g/100 cm$^3$ to about 15 g/100 cm$^3$, about 12 g/100 cm$^3$ to about 20 g/100 cm$^3$, about 13 g/100 cm$^3$ to about 20 g/100 cm$^3$, about 14 g/100 cm$^3$ to about 20 g/100 cm$^3$, or about 15 g/100 cm$^3$ to about 20 g/100 cm$^3$. It is also contemplated that any of the endpoints of the above ranges may be combined to form new and distinct ranges.

As was discussed above, butane working capacity (BWC) is a measure of the performance of activated carbon. BWC is determined for a sample by measuring the ability of the activated carbon to adsorb and desorb butane from dry air under specified conditions, and measures the difference between the butane adsorbed at saturation and the butane retained per unit volume of carbon after a specified purge. BWC can be tested in several ways, including procedures specified by ASTM International and which are known to those of skill in the art. Specifically, testing can follow ASTM D5228, which includes revisions D5228-16, D5228-92(2015), D5228-92(2005), and D5228-92(2000).

It should be noted that in addition to the methods of testing BWC that are described above, additional testing can be performed corresponding to various configurations. For example, the overall performance of the sorbent or sorbent materials as they installed in a vehicle fuel system is subject to various tests by governmental agencies, such as the U.S. Environmental Protection Agency (EPA). Such tests are not limited and include the tests that are conducted in a SHED testing chamber to determine one or more of resting loss, running loss, and hot soak. Such tests may be diurnal in configuration, for example for determining resting loss.

The sorbent material sheets of embodiments can be made by any suitable process. In some embodiments, sorbent material sheets can be made by pulverizing granular or pelletized sorbent material to a powder, mixing the powder with a binder to form a mixture, and blending the mixture, optionally heating, and rolling the mixture to form the sorbent material sheet. The step of pulverizing may produce sorbent particles having an average particle diameter of about 0.001 mm to about 0.2 mm, about 0.005 mm to about 0.1 mm, about 0.01 mm to about 0.075 mm, or any individual particle diameter or range encompassed by these example ranges, and in certain embodiments, the pulverized sorbent particles may have an average particle diameter of about 0.001 mm to about 0.01 mm The step of mixing the powder with a binder may include mixing the sorbent particle powder with about 2% to about 20% by weight or about 2% to about 10% by weight of the total composition, or any individual amount or range encompassed by these example ranges. Heating can be carried out at any temperature sufficient to remove residual solvent such as, for example, about 50° C. to about 200° C.

The sorbent material sheet of the invention may include various distributions of different sized particles to increase the packing efficiency of the powder within the sorbent material sheets. The selection of different sized particles can also improve rheological properties of the powder and surrounding binders, which allows improved mixing and uniform particle distribution before formation of the sorbent material sheets. In some embodiments, the particles of the sorbent material sheet may have a single particle size distribution, and in other embodiments, the particles may have two different particle size distributions. In further embodiments, the particle may have at least three different particle size distributions.

The mean particle sizes of at least two different particle populations, each having a particular size distribution, may be selected so that they have a ratio of between about 1:1 and about 1:15. In other embodiments, the mean particle sizes of the two different particle populations may have a ratio of about 1:2 to about 1:10. The mean particle sizes may also have a ratio of about 1:2 to about 1:5, or combinations of any of the above listed ratios.

The sorbent material sheets may be configured together in a variety of ways depending on the physical space that they must conform to, the required device performance, and the features which are included in proximity to the sheets. In some embodiments, the sheets may be corrugated, include folds, and/or include holes or apertures to increase the surface area of the sorbent material sheets that is exposed to the passing fluid, therefore increasing performance for a given total sheet surface area. The various corrugations, folds, holes, and apertures can also be sized and placed to make way for internal and external features, such as fluid channels, tubing, sensors, and valves. The folds of the sorbent material sheets may take a variety of forms, such as a spiral wrapped configuration in either a cylindrical or elliptical form. The folds may also be in the form of an "S" shape, or a convex or concave "C" shape depending on the required device dimensions and/or any other required internal or external features. The sorbent material sheets may also be stacked in a flat or curved configuration, and the stacked sheets may be square, rectangular, circular, oval, or other irregular shape as needed to fit the space intended. This, along with the texturing, in combination with the housing features discussed below, enables devices formed from the sorbent material sheets to fit within the confines of vehicle air intakes, air filters, air filter boxes, manifolds, intake runners, and other parts of a vehicle's air intake system.

In addition to the above described configurations, the sorbent material sheets may also have surface features. In some embodiments, the sorbent material sheets may include raised portions, and in other embodiments, the sorbent material sheets may include depressed portions. These surface features may be combined within the same sheet. The inclusion of raised and/or depressed portions in the sheets may be utilized to form various configurations between the sheets as they are stacked, wrapped, and so forth. For instance, the sheets can be aligned so that the raised and/or depressed portions nest with each other, which brings the adjacent sheets closer together. The sheets can also be aligned so that the raised and/or depressed portions do not nest with each other, which forms a gap between the adjacent sheets. The alignment can be used to form various open and closed channels for vapor adsorption between the sheets.

Carbon sheet performance can be improved by the addition of materials prior to or during sheet processing. These materials provide beneficial properties such as enhanced porosity or adsorption of inorganic vapors such as $H_2S$ or other volatile gases. Alternatively, different sorbent materials can be processed simultaneously into a single sheet with distinct sections or a performance gradient from one side of the sheet to the other.

Examples of additives that provide porosity include, but are not limited to, foam-like polymer additives; water-soluble polymers, which could be rinsed to leave behind pores; friable materials with particle size greater than the intended sheet thickness, which would break up and leave behind pores, materials that are thermally labile so that the sheet can be heated and the added materials vaporize, producing pores in the sheets, and other similar processes that could impart a controlled porosity within the sorbent sheets. Any of these may be used alone or in combination.

An alternative enhancement to sorbent sheet production is to process sorbent sheets such that two or more sorbents with different properties are included in a single sheet but are segregated along the width of the sheet. For example, a high BWC sorbent could be used in the same sheet with a low BWC sorbent, such that the vapors from fuel tank emissions would contact the high BWC sorbent ahead of the low BWC sorbent, within a single chamber. That is, in some embodiments, low and high BWC sorbents could be homogeneously mixed, or in some embodiments, there could be distinct sections of low or high BWC sorbents as desired.

Another example is a high BWC sorbent for adsorption of butane, included with a sorbent that would remove $H_2S$ or other undesirable vapors that are not normally well removed by a high BWC activated carbon, for example.

Sorbent Material Sheet Product

In certain embodiments, sorbent material sheet (such as Calgon Carbon's CALFLEX) is produced as described above and laminated or otherwise attached to a backing sheet in order to form a sorbent material sheet product. The backing sheet is not limited and can be any polymer material that is capable of supporting the sorbent material sheet while enabling the overall sorbent material sheet product to be fixed to various components in a vehicle's air intake system.

The sorbent material sheets described above are combined into a sorbent material sheet product. The combination of the sorbent material sheets takes advantage of one or more of the above described features, such as increased surface area/volume ratio, reduced void space, improved sorbent performance, etc. In general, the individual sorbent material sheets are arranged next to each other to form a sorbent material sheet product that comprises sheets that are stacked, rolled, wound, folded, and/or laminated such that the surfaces of the sorbent material sheets are in close proximity to, or adjacent to each other. Whatever the arrangement, the goal is to maximize the surface area of the sheets exposed to the vapor, fluid, and/or gas stream and thus the performance of the sorbent material sheets In some embodiments, the backing sheet is formed of polyester, polyethylene, low density and high density polyethylene, polypropylene, polytetrafluoroethylene (PTFE or TEFLON), polyvinylidene fluorides (PVF2 or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers, perfluoroelastomers (FFKM) and/or tetrafluoro ethylene/propylene rubbers (FEPM), aramid polymers, para-aramid polymers, meta-aramid polymers, poly trimethylene terephthalate, ethylene acrylic elastomers, polyimide, polyamide-imides, polyurethanes, biaxially oriented polypropylene (BoPP), polyethylene terephthalate (PET), biaxially oriented polyethylene terephthalate (BoPET), polychloroprene, any hydrocarbon permeable membrane, and copolymers and combinations thereof. Any of the above materials which can be woven or non-woven fibers.

The backing sheet may have any structure, including an extruded sheet, non-woven sheet, woven sheet, cast sheet, injection molded sheet, and combinations thereof.

In some embodiments, the backing sheet is formed of the same material as the binder of the sorbent material sheet. In other embodiments, the backing material is formed of a different material than the binder of the sorbent material sheet.

The structure and methods of attaching the sorbent material sheet to the backing sheet to form the sorbent material sheet product is not particularly limited. In some embodiments, the sorbent material sheet is laminated by passing the sorbent material sheet and the backing sheet through a roll mill. In other embodiments, the sorbent material sheet and the backing sheet are coextruded from a single extrusion die. In other embodiments, the sorbent material sheet and the backing sheet are bonded by at least one layer of adhesive or by the surface energy of at least one of the sorbent material sheet or the backing sheet. In some embodiments, the sorbent material sheet and the backing sheet are bonded together by positioning a double sided adhesive substrate between the sorbent material sheet and the backing sheet. In some embodiments, the sorbent material sheets may be edge sealed to a backing sheet, or encapsulated between sheets, in some instances, the membrane is sealed past the carbon, meaning the carbon is within a pocket formed by backing material. In some embodiments, the carbon sheets may be laminated fully, partially or within the bounds of the lamination. i.e. not extending to the edge of the device In still further embodiments, the sorbent material sheet and the backing sheet are attached by sonic welding or mechanical fasteners including staples, screws, nails, clamps, tabs, or posts. In some embodiments, a backing sheet may be provided on either side of a sorbent material sheet. Similarly, in some embodiments, separate sorbent material sheets may be placed on either side of a backing sheet. In still other embodiments, multiple alternating layers of sorbent material sheets and backing sheets may be employed.

In some embodiments, the backing sheet is omitted entirely and the sorbent material sheet product can itself be used directly, either alone or with a fastener or adhesive backing. In one embodiment, the sorbent material sheet product comprises a sorbent material sheet with an adhesive on one side for fastening directly to an air intake. In such embodiments, the sorbent material sheet product may be provided with a release liner to protect the adhesive before application to the air intake.

In several advantageous embodiments of the disclosure, one or more of the sorbent material sheets, the backing sheet, or both include a porous cover layer that can include an "edge seal" that assists in the production, handling, and installation of the sorbent materials sheets or a sorbent material sheet product that is formed from one or more of the sorbent material sheets. During the production, handling, and installation of conventional sorbent sheets, particles of sorbent material are frequently dislodged from the sorbent material sheets. These dislodged particles cause dust that is undesirable because they can damage equipment, increase the need for cleaning, and are a respiratory hazard. The porous cover layer and optionally the associated edge seal avoids this by providing a region of the sorbent material sheets or the sorbent material sheet product where the edges of the sheets along the periphery are formed so that the sorbent material cannot be dislodged. In some embodiments, the one or more edges along the periphery are formed so that there is no sorbent material included in the binder, thereby ensuring that no material can be dislodged. The exclusion of the sorbent material from these regions ensures that during handling and manufacture of the sorbent material sheet or sorbent material sheet product, the regions that are most heavily handled do not produce any dust. When the edge regions of the sorbent material sheet product have no sorbent material, this is formed by surrounding the sorbent material sheet with the porous cover layer and then bonding the porous cover layer together that extends beyond the edge of the sorbent material, much like a pouch.

The form of the porous cover layer is not limited so long as it is not damaged by the vapors that the sorbent material sheet product is expected to encounter (such as hydrocarbon vapors) and that it is sufficiently porous to allow those vapors to contact the sorbent material within the sorbent material sheets. The porous cover layer can be a non-woven layer, a woven layer, a layer of yarns, or combinations of one or more of the preceding embodiments. As non-woven layers, the disclosure contemplates those made by melt-blowing, spun bonding, flash spinning, air laying, batting, or fibrillating an existing sheet, though these are not particularly limited.

Alternatively, one or more edges along the periphery still include sorbent material, but one or more porous cover layers are bound together to prevent the sorbent material from being dislodged. In still more embodiments, one or more additional edge seal binders are added to the edge seal ensure that no sorbent material is dislodged. The composition of the porous cover layers or the additional edge seal binders are not limited, and include one or more of polytetrafluoroethylenes (PTFE or TEFLON), polyvinylidene fluorides ($PVF_2$ or PVDF), ethylene-propylene-diene (EPDM) rubbers, polyethylene oxides (PEO), UV curable acrylates, UV curable methacrylates, heat curable divinyl ethers, polybutylene terephthalate, acetal or polyoxymethylene resin, fluoroelastomers such as perfluoroelastomers (FFKM) and tetrafluoro ethylene/propylene rubbers (FEPM), aramid polymers such as para-aramid and meta-aramid polymers, poly trimethylene terephthalate, ethylene acrylic elastomers, polyimide, polyamide-imides, polyurethanes, low density and high density polyethylene, polypropylene, biaxially oriented polypropylene (BoPP), polyethylene terephthalate (PET), biaxially oriented polyethylene terephthalate (BoPET), polychloroprene, and copolymers and combinations thereof. In some embodiments, the edge seal binder is different from the binder present in the remainder of the sorbent material sheet product. In some embodiments, the edge seal binder is the same as the binder present in the remainder of the sorbent material sheet product. In still other embodiments, the edge seal binder is the same as the porous cover layer.

In still other embodiments, the edge seal is formed by further treatment of one or more edges of the sorbent material sheets or backing sheets, referred to as an edge sealing treatment. The edge sealing treatment is not limited and includes one or more of localized heating by infrared radiation, ultrasonic vibration, or contact with a heated tool; localized curing or localized crosslinking by ultraviolet radiation or oxidizing or free radical compounds; localized application of adhesive, binder, tackifier, or primer; mechanical fastening by at least one of stitches, folds, staples, or clamps, and combinations of the preceding techniques. However, it can also be appreciated that in certain embodiments, no edge sealing treatment is performed and the edge seal is formed by omitting the sorbent material particles from the area of the edge seal.

The configuration of the edge seal is not limited. In some embodiments, the edge seal extends around the entire perimeter of the sorbent material with no interruptions. In other embodiments, the edge seal extends around the entire perimeter but is punctuated by one or more of a separate adhesive layer, a double sided adhesive tape or substrate, heat staking, sonic welding, or mechanical fasteners including staples, screws, nails, clamps, tabs, posts, or holes that are used to attach the sorbent material sheets to other sorbent material sheets or to another substrate. In still further embodiments, the edge seal does not extend around the entire perimeter and is only present in those regions where handling is predicted to occur. In further embodiments, the edge seal is present around regions of the interior of the sorbent material sheets that are used for attaching the sorbent material sheets to other sorbent material sheets or to other substrates.

Figure 6:
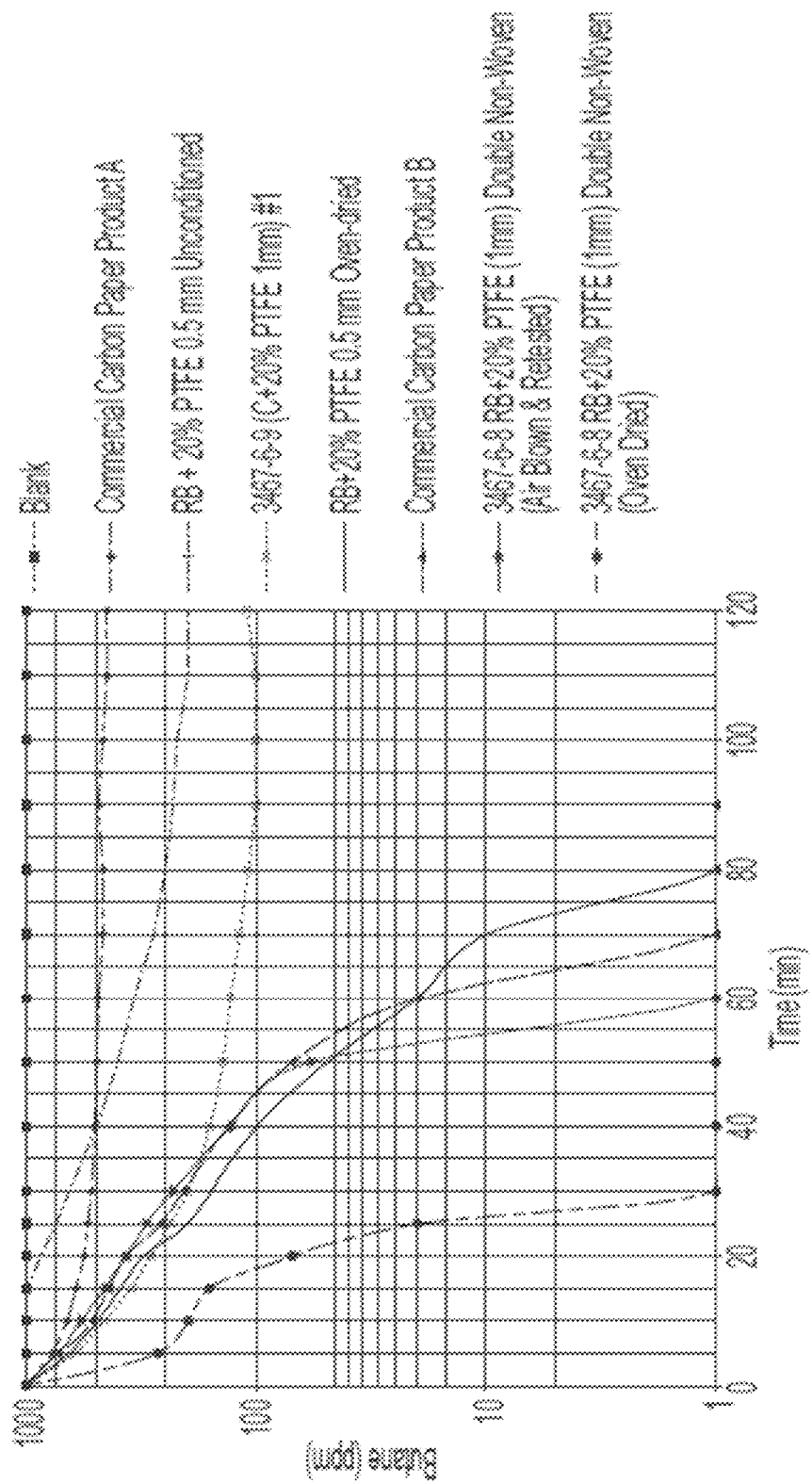
FIG. 6 depicts the test results of an embodiment of the disclosure.

The size of the edge seal is not limited and is measured by how far the edge seal extends inwards from an edge of the sorbent material sheet into the bulk of the sorbent material sheet, or outwards from the edge of a device or attachment (for example, a hole) that attaches the sorbent material sheet to another sorbent material sheet or to an external substrate. This size is referred to herein as the "edge seal width." The edge seal width can be about 1 mm, about 2 mm, about 2.5 mm, about 3 mm, about 4 mm, about 5 mm, about 6 mm, about 7 mm, about 8 mm, about 9 mm, about 10 mm, about 15 mm, about 20 mm, about 25 mm, or about 30 mm, or any range formed by one or more of the above values. In certain embodiments, the edge seal width is about 1 mm to about 10 mm, or about 1 mm to about 7 mm, or about 1 mm to about 5 mm, about 2.5 mm to about 5 mm, or any combination of one or more of the preceding ranges. One example depiction of the edge seal and the edge seal width appears in FIGS. 6 and 7, where edge seals that are formed by localized heating are present around the entire perimeter of a sorbent material sheet and around the holes that are used for mounting the sorbent material sheet to an external substrate which is a surface of an air intake box.

In some embodiments, the sorbent sheet product is rolled. The rolled sorbent sheet product has a BWC greater than about 7 g/100 cm$^3$. The rolled sorbent sheet product has a BWC of about 7.0 g/100 cm$^3$ to about 30 g/100 cm$^3$, or greater than about 12 g/100 cm$^3$, or greater than about 13 g/100 cm$^3$, or greater than about 14 g/100 cm$^3$, or greater than about 15 g/100 cm$^3$, or greater than 20 g/100 cm$^3$. Ranges are also contemplated, such as about 10-20 g/cm$^3$, about 10-12 g/cm$^3$, about 10-14 g/cm$^3$, about 12-14 g/cm$^3$, about 12-15 g/cm$^3$, and about 15-20 g/cm$^3$.

A rolled sorbent sheet product as described herein has a generally cylindrical shape having a length substantially greater than its diameter, although any dimension can be employed, including conical, or frustro-conical variations, as well as ellipsoids, or other shapes.

The density of the rolled sorbent sheet product may be computed based on the formulas below:

Roll Density Calculations (US units)

$$\rho\left(\frac{lb}{ft^3}\right) = (3) + \frac{BW*L}{\left(\frac{OD^2}{4} - \frac{ID^2}{4}\right)*\pi}$$

$BW$: Basis Weight $\left(\frac{oz}{yd^2}\right)$ $L$: Length on Roll (yd)

$OD$: Outer Roll Diameter (in)

$ID$: Inner Roll Diameter/Core Diameter (in)

$W$: Machine width or roll length (in)

$\rho$: Roll Density $\left(\frac{lb}{ft^3}\right)$

Roll Density Calculations (SI units)

$$\rho\left(\frac{kg}{m^3}\right) = (1000) + \frac{BW*L}{\left(\frac{OD^2}{4} - \frac{ID^2}{4}\right)*\pi}$$

$BW$: Basis Weight $\left(\frac{g}{m^2}\right)$ $L$: Length on Roll (m)

$OD$: Outer Roll Diameter (mm)

$ID$: Inner Roll Diameter/Core Diameter (mm)

$W$: Machine width or roll length (mm)

$\rho$: Roll Density $\left(\frac{kg}{m^3}\right)$

The rolled sorbent sheet product may be wound to an average roll density of about 80-1500 kg/m³, about 500-2000 kg/m³, about 750-1500 kg/m³, about 900-1200 kg/m³, about 900-1050 kg/m³, about 400-500 kg/m³, about 500-600 kg/m³, about 500-550 kg/m³, about 600-650 kg/m³, about 650-700 kg/m³, and about 700-750 kg/m³.

The rolled sorbent sheet product has a BWC greater than about 7 g/100 cm³. In some embodiments, the rolled sorbent sheet product has a BWC of about 7.0 g/100 cm³ to about 30 g/100 cm³. The rolled sorbent sheet product may also have BWCs that are the same as the above described sorbent sheet products which are not rolled.

Similar to the discussion above with respect to the stacked sorbent material sheets, the wound or rolled sorbent material sheets may include multiple particle size distributions or populations of the adsorbent pelletized or powdered activated carbon. The same ratios are contemplated as discussed above. Similar to the discussion above, this results in greater performance because it enables a larger amount of the activated carbon to be incorporated into the sheets which are formed into the rolled sorbent sheet product.

As used herein, wound or rolled sorbent sheet products refer to any form of layering of one or more sorbent material sheets by winding, spiral winding, concentric layering or tubular (of any cross-sectional shape, e.g. round, elliptical, square, triangular, rectangle, etc.) or combination thereof. For example, a single sorbent material sheet may be spiral wound along its length to form a cylindrical-shaped rolled sorbent material sheet product. As another example, a plurality of sorbent material sheets can be stacked and then wound together to form a similar cylindrical shape. As another alternative, several sheets each formed into a cylinder having a slightly different diameter from the next can be arranged such that they form concentric rings in cross-section of a similarly sized cylinder. Various combinations of these and other arrangements may be used to fill the space within any shape of housing or canister or air intake, as described elsewhere herein.

As used in the context of a wound or rolled sorbent material sheet or sheets, the term substantially parallel is used to mean that at a minute, infinitely small dimension, the two sheets or portions of the same sheets are the same distance from each other in all directions. However, it is also understood that in the context of the wound or rolled sorbent material sheets, especially those that are a single sheet wound in a spiral around a center or core, that this means that the sheets are not exactly the same distance apart from each other over the entire areas that face each other. Furthermore, it is understood that in this context, similar variations in distance are contemplated between the sheet or sheets due to components such as spacers, sensors, apertures, tubing, ports, valves, channels, corrugations, pleats, folds, deformation encountered during manufacturing or operation, deformation due to the shape or pressures applied by or through the external housing or air intake, different wrapping techniques such as to seal the periphery of the sheets, and so forth.

Similar to the stacked sheet arrangement, the rolled sorbent sheet product has improved performance over the equivalent volume of activated carbon that is provided in pelletized or powdered form.

Performance improvements of the rolled sorbent material sheet product of the invention can be measured as the performance of the product having a given amount of activated carbon versus the performance of that same amount and grade of activated carbon if provided within a canister in a pelletized or powdered form. In some embodiments, the rolled sorbent sheet product has a BWC that is about 3% higher, about 5% higher, about 7% higher, about 9% higher, about 10% higher, about 12% higher, about 14% higher, and about 16% higher than the same amount and grade of activated carbon within a canister in pelletized or powdered form. Ranges based on these amounts are also contemplated, such as performance that is between about 5-16% higher, between about 5-14% higher, between about 10-14% higher, and so forth.

The sorbent material sheets in the sorbent material sheet product, may be configured as being flat, wound in a spiral cylinder, wound in an elliptical form, wound in an elongate rectangular bar, folded, laminated in an "S" shape, formed as concentric cylinders, formed as concentric ellipses, formed as a concentric rectangular bar, or as combinations of these forms.

In some embodiments, the sorbent material sheet product will comprise a single sorbent material sheet that is wound or rolled to achieve the desired characteristics including, but not limited to density, void space, pressure drop, capacity, etc.

Stacked Sorbent Material Sheet Product: The stacked sorbent material sheet product of the invention comprises two or more sorbent sheets each defining an upper surface and a lower surface, and having a known combined total surface area, wherein each sorbent sheet comprises a sorbent material and a binder; where adjacent sorbent sheets are stacked and arranged such that adjacent upper and lower surfaces are substantially congruent with each other, and aligned to allow fluid flow at least between adjacent upper and lower surfaces.

Performance improvements of the stacked sorbent material sheet product of the invention can be measured as the performance of the product having a given amount of activated carbon versus the performance of that same amount and grade of activated carbon if provided within a canister in a pelletized or powdered form. In some embodiments, the stacked sorbent sheet product has a BWC that is about 3% higher, about 5% higher, about 7% higher, about 9% higher, about 10% higher, about 12% higher, about 14% higher, and about 16% higher than the same volume and grade of activated carbon within a canister in pelletized or powdered form. Ranges based on these amounts are also contemplated, such as performance that is between about 5-16% higher, between about 5-14% higher, between about 10-14% higher, and so forth.

Air Intake

The sorbent material sheet product, which as described above in various embodiments, is in some embodiments part of an air intake. As used herein, the term "air intake" means all structures through which air or other oxidizers pass before entering the combustion chamber of an engine. The choice of engine is not particularly limited, and includes internal combustion engines that operate using any known liquid fuel, or external combustion engines that operate using any known liquid fuel. In some embodiments, the engine is a gasoline engine that is in a car, truck, motorcycle, boat, ship, helicopter, airplane, lawnmower, small displacement devices, ATVs, snowmobiles, snow blowers, other lawn equipment and other small motor devices. In other embodiments, the engine is a diesel engine that is in a car, truck, motorcycle, boat, ship, helicopter, or airplane. In still other embodiments, the engine is a gas turbine engine that is in a car, truck, motorcycle, boat, ship, helicopter, or airplane. The engine may run on any fuel or combination of fuels, including gasoline, diesel, ethanol, kerosene, natural gas (methane), propane, butane, jet fuel, Jet A, Jet A-1, methanol, vegetable oils, biofuels, biodiesel, biogas, butanol, and combinations thereof.

When used in an air intake, the sorbent material sheet product captures fuel vapors by contacting the sorbent material sheet product with the fuel vapors and thereby adsorbing the fuel vapors on sorbent material sheet product. After the fuel vapors are adsorbed, the fuel vapors can be desorbed by contacting the sorbent material sheet product with a purging gas. The purging gas is not particularly limited and can include air, nitrogen, oxygen, oxidizer such as nitrous oxide, water vapor, or any other gas that passes over the sorbent material sheet product and which can contain additional fuel vapors.

The sorbent material sheet product may be attached or adhered by any device to the interior or exterior of the air intake. The attachment to the air intake is not limited and includes an adhesive layer, a double sided adhesive tape or substrate, heat staking, sonic welding, or mechanical fasteners including staples, screws, nails, clamps, tabs, holes, or posts.

The sorbent material sheet product can be placed in any location within an air intake so that it can absorb or adsorb hydrocarbon vapors that would otherwise escape from the combustion chamber, injectors, carburetor, fuel ports, crankcase, or other engine components. In some embodiments, the sorbent material sheet product is placed within an air filter box or air filter housing, on or within an air filter, within an air intake tube, within a mass air flow sensor, within a throttle body, within an air intake manifold, within an air intake runner that is connected to an individual cylinder or combustion chamber, or within an air intake runner that is connected to multiple cylinders or combustion chamber. In some embodiments, a single sorbent material sheet product is positioned within one of the locations described above. In other embodiments, more than one sorbent material sheet product is positioned in one or more of the locations described above.

The stacked sorbent sheet product has a BWC at least 10% higher than the BWC of a pelletized/powdered form of the same amount by volume of the sorbent material in the sorbent sheet. The stacked sorbent sheet product has a BWC greater than about 7 g/100 cm$^3$. The stacked sorbent sheet product has a BWC of about 7.0 g/100 cm$^3$ to about 30 g/100 cm$^3$, or greater than about 12 g/100 cm$^3$, or greater than about 13 g/100 cm$^3$, or greater than about 14 g/100 cm$^3$, or greater than about 15 g/100 cm$^3$, or greater than 20 g/100 cm$^3$. Ranges are also contemplated, such as about 10-20 g/cm$^3$, about 10-12 g/cm$^3$, about 10-14 g/cm$^3$, about 12-14 g/cm$^3$, about 12-15 g/cm$^3$, and about 15-20 g/cm$^3$.

In some embodiments, the stacked sheets are held in a spaced apart relationship which controls one or more of void volume, flow rate, pressure drop, and other characteristics. Such spacing is achieved in some embodiments where at least one of the two or more sorbent material sheets is corrugated. The spacing can also be achieved with various folds in the sheets, and can also be achieved by the corresponding raised and/or depressed portions of the sheets which are aligned to form gaps between the sheet. If the sheets are arranged deliberately so that the raised and/or depressed portions of the sheets do not nest between sheets, this results in additional spacing between the sheets and permits fluid flow in those portions. If the sheets are arranged deliberately so that at least some raised and/or depressed portions nest between sheets, this results in a tighter fitting stack of sheets and decreases the spacing between the sheets, with a corresponding decrease or even stop in fluid flow. Combinations of these features can be used to form stacked sorbent sheet products with directed regions or channels for fluid flow and barriers or edge seals to prevent fluid leakage. These features for fluid flow can also include holes, cuts, or apertures through one or more of the sheets in the stacked sorbent sheet product.

Each sorbent sheet defines opposed lateral edges which are substantially parallel to fluid flow. The congruent lateral edges of adjacent sorbent sheets may be separate from each other, bound together or some combination thereof. In this manner, the edges of the stacked sorbent material sheet product may be sealed, partially sealed, or unsealed. The sealed or unsealed nature can be chosen to achieve desired results such as modifying fluid flow rate and/or patterns or other properties.

In some embodiments, the stacked sorbent material product yields a void volume of about 10% or more, about 12% or more, about 14% or more, about 15% or more, about 16% or more, about 17% or more, about 18% or more, about 19% or more, about 20% or more, about 21% or more, about 22% or more, about 23% or more, about 24% or more, about 25% or more, about 26% or more, about 27% or more, about 28% or more, about 29% or more, or about 30% or more, or any range formed by combining the above ranges. In some embodiments, the stacked sorbent material product yields a void volume of about 10%, about 12%, about 14%, about 15%, about 16%, about 17%, about 18%, about 19%, about 20%, about 21%, about 22%, about 23%, about 24%, about 25%, about 26%, about 27%, about 28%, about 29%, or about 30%, or any range formed by combining the above ranges. In some embodiments, the stacked sorbent material product yields a void volume of about 10-15%, about 15-20%, about 20-25%, about 25-30%, or about 30-35%.

In some embodiments, each sorbent sheet has a density of about 0.08 g/cm$^3$ to about 1.5 g/cm$^3$.

In some instances, the sorbent material sheet product comprises at least two populations of sorbent material particles, wherein each of the at least two populations have different average particle diameters. See the above description of the bimodal particle size distribution which was discussed with respect to the individual sorbent material sheets. The same distribution ratios as between populations of sorbent particles are contemplated with respect to product formed of multiple sorbent material sheets. In some instances, the density of the sorbent material particles achieved by the at least two populations is greater than the density achieved by either population alone. The inclusion of a bimodal particle size distribution can also be used to improve the mechanical properties of the sorbent material sheet product because it makes the polymeric sheets much more resistant to shear forces.

In some instances, a sorbent material sheet product comprises at least two sorbent material sheets, each of which has a defined upper surface and lower surface which have a combined total surface area, and wherein each sorbent material sheet comprises a sorbent material and a binder, and wherein each sorbent material sheet is stacked and arranged such that adjacent upper and lower surfaces of the separate sheets are substantially parallel and are aligned to allow fluid flow at least between the adjacent upper and lower surfaces.

The term substantially parallel as used in the context of a stacked sorbent material sheet product means that the sheets maintain the same distance apart over their entire area, but with exceptions made for various physical characteristics and features. These exceptions that still fall within the scope of substantially parallel include but are not limited to differences due to variations in components such as spacers, sensors, apertures, tubing, ports, valves, channels, corrugations, pleats, folds, deformation encountered during manufacturing or operation, deformation due to the shape or pressures applied by or through the external housing or air intake, different wrapping techniques such as to seal the peripheries of the sheets, and so forth.

In some embodiments, the sorbent material sheet product has a BWC value about 5%, about 10%, about 15%, about 20%, about 25%, about 30%, about 35%, about 40%, about 45%, and about 50% higher than the BWC of the same volume of sorbent material in pelletized or powdered forms. These can also be combined to form ranges, for example, between about 5-25% higher. The invention also contemplates that these amounts are the endpoints on ranges, such as at least about 40% higher.

Wound/Rolled Sorbent Material Sheet Product: The sorbent material sheet product can also be wound or rolled as an alternative or in combination with stacked embodiments. A wound or rolled sorbent material sheet product comprises a sorbent sheet defining an upper surface and a lower surface, and combined has a known total surface area, wherein the sorbent sheet comprises a sorbent material and a binder where the sorbent sheet is spiral wound to create adjacent sheet layers which allow fluid flow around and between adjacent sheet layers.

Additional Embodiments

Additional embodiments are also contemplated. In one embodiment, the form of the sorbent material sheet product is a rolled sheet that includes a sorbent material sheet. In another embodiment, the form of the sorbent material sheet product is a shredded sheet that includes shredded strips of the sorbent material sheet. In another embodiment, the form of the sorbent material sheet product is cut sheets of the sorbent material sheet in various shapes. When the sheets are shredded or cut, the x and y dimensions of the sheet are larger than the thickness of the sheet.

In still other embodiments, the form of the sorbent is not as a sheet product, but is instead strands of binder and sorbent. The strands may be individual, woven, non-woven, or in other forms including rope or yarn. These forms can be achieved by fibrillating the binder with the sorbent to as to form thin strands which are then combined into other forms.

The rolled sheets are typically made by winding the sheets around a solid, central, cylindrical spindle. This is some solid polymer or other material. The spindle is solid and takes up volume. In other instances, the sheet is wound about an open central core, such as a rigid or semi-rigid tube. In either case, the center does not contribute to the performance of the sorbent device. This application is directed toward putting that central core to good use. The activated carbon sheet is wound around an adsorptive core material producing a spiral wound device with additional adsorptive capacity.

The center core is fabricated from sorbent material or as a structure that would serve as a core with internal volume filled with sorbent material. The advantage of this would be to increase the amount of adsorbent within the device, thereby increasing performance. The central core could take the form of an open space, a hollow tube, a perforated hollow tube, or other structure used to define a space which holds additional sorbent material. The increase in sorbent material should result in even better performance.

The center core may include not only the sheets described above, but also the other forms of the sorbent material, such as the cut or shredded sheets, rope, yarn, and the like.

Another improvement relates to improving flow between the spiral wound sheet or sheets. Winding of carbon sheets into spirals to form an adsorber was accomplished by controlling the tension of the winding process. Because the sheets are flexible and of low tensile strength, this sometimes leads to adsorbers where the spacing between the wound sheets was inconsistent, difficult to control or non-existent. The use of spacers, for example in the form of woven or non-woven, netting or other fabric or incorporating particles into the sheet whose diameter is larger than the sheet thickness leads to higher tensile strength material with pre-defined spacing between wound layers. The sheet could also be perforated to overcome issues with inconsistent winding spacing by providing a pathway between wound layers preventing blinding off of carbon and by-pass.

A biplanar spacer can be incorporated into the spiral wound adsorber during the winding process. A separate biplanar spacer, made from either a polymer, fabric, metal, carbon fiber or activated carbon fiber or combinations thereof would be wound with the carbon sheet to form the final assembly. The spacer could be of different thicknesses to control the size and pressure drop across the adsorber. The orientation of the spacer could be used to control the flow of the fluid in a path that is not necessarily the shortest distance increasing the fluid carbon contact time. This would also increase the tensile strength of the unit.

In some embodiments, the spacer can be a non-woven porous material. Non-woven porous materials could be incorporated into the wound structure that would allow uniform spacing with a controlled pressure drop. Tensile strength would also be improved.

To increase the tensile strength of the carbon sheet, a polymer or fibrous netting could be incorporated into the carbon sheet during the roll milling process. The netting could be of various configurations and thicknesses depending on the desired properties of the final sheet. The goal is to increase the tensile strength of the material allowing for more reliable winding to maintain separation and ease of manufacture.

Some embodiments achieve similar results by incorporating perforated sheets. The wound sorbent sheets could be perforated before winding so that imperfections in the winding process would be mitigated and provide for alternate pathways for fluid flow through the adsorber.

Rather than woven or non-woven materials, granular or pelleted activated carbon could be used as a spacer. Activated carbon or some other rigid granular material, preferably a sorbent material, can be added to the carbon sheet either before or after milling to serve as the spacer and to add adsorptive capabilities.

Any of these spacers could be used with stacked sheets as well as wound sheets with the same advantages. In either structure, the spacer creates uniform spacing. Texture such as corrugation or other surface features could also be employed to achieve the desired characteristics and flow.

In some embodiments, the various components such as sorbent material sheets, spacers, woven and/or non-woven materials, perforated or non-perforated sheets, additional sorbent material, and other components may be rolled in alternating fashion, which is sometimes referred to as a "jelly roll" structure as the alternating components remain parallel with each other and spiral around a core in repeating bands. This embodiment is most useful for embedding spacers or other pleated, textured, or corrugated components between sorbent sheets to precisely control the spacing in between the sheets and therefore pressure drop and performance In still further embodiments, the components may be co-nested within each other as tubes and not wound in a spiral. In further embodiments, the components can be layered as flat sheets or non-cylindrical shapes.

Figure 2:
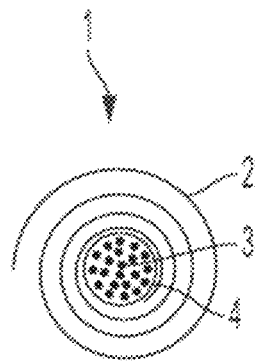
FIG. 2 depicts a further embodiment of the invention utilizing a sorbent core.

Various embodiments are shown in the Figures. FIG. 1 shows the improvement of including sorbent within a central core of wound sorbent material sheets. In FIG. 1, the wound sorbent material sheet 1 is depicted as including sorbent material sheet 2 which is wrapped around a central core of sorbent 3. In another embodiment, FIG. 2 depicts a wound sorbent material sheet 1 that includes sorbent material sheet 2, again wrapped around central core of sorbent 3. However, the embodiment of FIG. 2 further includes a tube 4 or other similar structure that surrounds the sorbent 3. The tube 4 may include perforations, tears, apertures, or other similar features (not shown) to permit at least some gas or vapor to pass between the sorbent contained in the central core and the sorbent sheet material in the outer portion.

Figure 3:
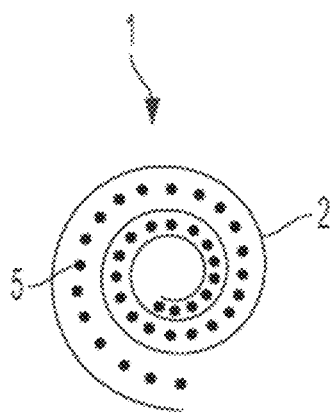
FIG. 3 depicts a further embodiment of the invention utilizing spacers.
Figure 4:
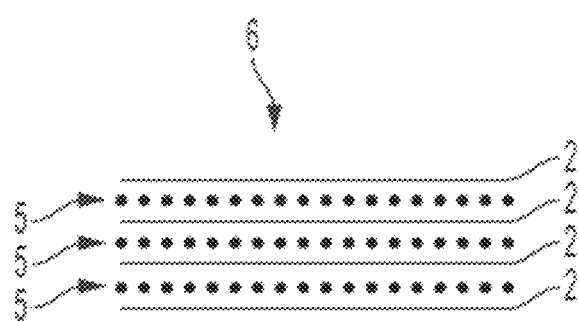
FIG. 4 depicts a further embodiment of the invention utilizing spacers.

In still further embodiments, FIG. 3 depicts a wound sorbent material sheet 1 that includes sorbent material sheet 2, and further includes a spacer 5 that is included to precisely control the spacing and therefore pressure drop and other performance characteristics of the wound sheets. FIG. 4 depicts an additional embodiment, where stacked sorbent material sheet 6 includes several stacked sorbent material sheets 2. In between each pair of sorbent material sheets 2 is a spacer 5 that is used to precisely control the spacing and therefore pressure drop and other performance characteristics of the stacked sheets.

In some instances, the sorbent material sheet product may be directly applied to a surface, e.g. an air intake manifold, or may be selectively cured at the outer sheets so that a durable, cured shell forms that acts as a support for the rolled or folded sorbent sheets. Such selective curing can be accomplished thermally or with a chemical bath, or via actinic radiation, such as ultraviolet light or by electron beam curing.

In embodiments where the sorbent material sheets omit a housing they may be contained within the space where capture is required, such as the air intake manifold, or associated pipe work, the sorbent material sheets may be attached to these parts in a variety of ways. In some embodiments, the sheets are heat staked into the desired position and location. In some embodiments, the sorbent material sheets can be fastened using mechanical fasteners such as screws, rivets, or clamps, or the sorbent material sheets may be fastened using an adhesive backing. The adhesive backing may be a single layer of adhesive or a double sided adhesive tape or sheet. The adhesive used in the adhesive backing may include pressure sensitive adhesives, UV curing adhesives, thermally curing adhesives, hot melt adhesives, and reactive multi-part adhesives. Adhesive compositions include acrylic and (meth)acrylic, acrylate and (meth)acrylate, epoxies in one- and two-part formulations, and urethane.

Figure 7:
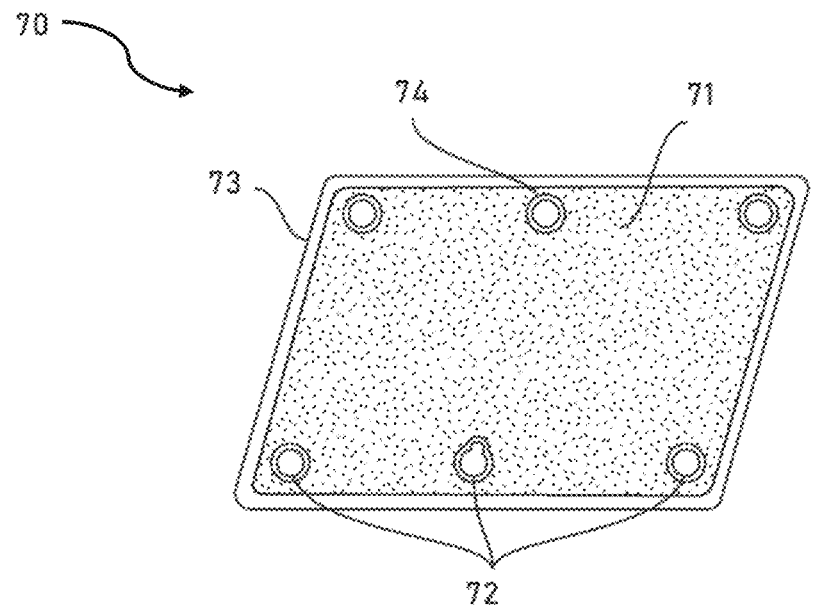
FIG. 7 depicts an exemplary edge-sealed sorbent material sheet product in accordance with one embodiment.
Figure 8:
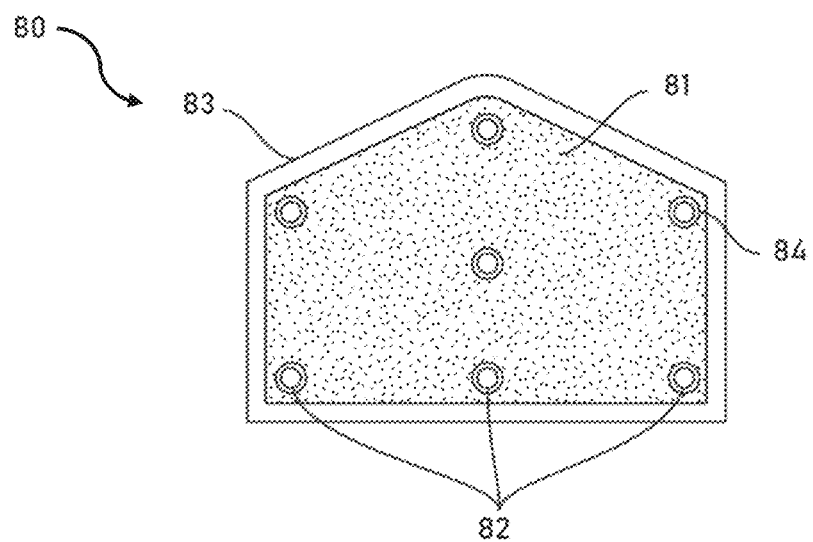
FIG. 8 depicts another exemplary edge-sealed sorbent material sheet product in accordance with one embodiment.

The devices of various embodiments may include a housing and the sorbent material sheets described above. The housing may be any shape and can be configured for purifying gases. For example, in some embodiments, the housing may be any shape such as, for example, cuboidal, cubic, or cylindrical. The sorbent material sheets may be sized to fit within the housing and substantially fill a space within the housing through which the gas or liquid is passed. In some embodiments, two or more sorbent material sheets may be stacked to substantially fill the housing, and in other embodiments, the sorbent material sheets may be rolled to form a spiral wound sheet or pressed to form a stacked sheet. In some embodiments, the stacked or pressed sheets may be such that the sides of adjoining sheets are substantially contiguous. In other embodiments, stacked or pressed sheets may be positioned such that adjoining sheets are spaced. For example, in certain embodiments, the sheets may be corrugated, having sorbent material sheets that form a series or parallel ridges and furrows, and in some embodiments, corrugated sorbent material sheets may be separated by flat or textured sorbent material sheets. The corrugated sorbent material sheets may be disposed within the housing in a stacked or rolled/spiral wound form. FIGS. 7 and 8 depict two exemplary sorbent products that can be affixed within and air intake box.

Referring to FIG. 7, a parallelogram shaped sorbent material sheet product 70 is depicted in accordance with an embodiment. The sorbent material sheet product 70 includes a sorbent material sheet product 71 that includes polypropylene non-woven fibers and PTFE binder, and holes 72 that are for use in mounting the sheet product 70 to an air intake box (not shown). An edge seal 73 is present along the perimeter of the sheet product 70 and extends inwards from the outer edge of the sheet product 70. Separately, there is also an edge seal 74 that extends outward from the outer edge of each hole 72.

Referring to FIG. 8, a trapezoidal shaped sorbent material sheet product 80 is depicted in accordance with an embodiment. The sorbent material sheet product 80 includes a sorbent material sheet product 81 that includes polypropylene non-woven fibers and PTFE binder, and holes 82 that are for use in mounting the sheet product 80 to an air intake box (not shown). An edge seal 83 is present along the perimeter of the sheet product 80 and extends inwards from the outer edge of the sheet product 80. Separately, there is also an edge seal 84 that extends outward from the outer edge of each hole 82.

In various embodiments, the void fraction may be about 30% to about 32% less than the void volume for current devices, and in some embodiments, the void fraction may be as low as about 10%. For example, the devices may have a void fraction of about 45% to about 10%, about 35% to about 10%, about 25% to about 10%, or any individual void fraction or range encompassed by these example ranges. The devices of various embodiments may exhibit less flow restriction, e.g. pressure drop, than devices having granular or pelleted sorbent materials. Thus, more adsorbent material can be incorporated into such devices without reducing the flow rate of the device.

The devices of such embodiments may have BWCs of greater than about 4.0 g/100 cm$^3$, and in some embodiments, the devices may have a BWC of about 4.0 g/100 cm$^3$ to about 20 g/100 cm$^3$, 5.0 g/100 cm$^3$ to about 18 g/100 cm$^3$, about 7.0 g/100 cm$^3$ to about 16 g/100 cm$^3$, or about 8.0 g/100 cm$^3$ to about 15 g/100 cm$^3$, or any individual BWC or range encompassed by these example ranges. The devices may exhibit a pressure drop that is at most equal to a conventional dense packed bed of powders, pellets, or granules of activated carbon or other activated compounds. This feature is advantageous because it ensures that the inventive sorbent material sheet product, whether stacked, rolled, wound, or otherwise configured, still has the same ability to process and transfer vapors and gases as conventional devices, despite the increased sorbent performance.

In some embodiments, an air intake manifold may be provided with integral vapor adsorption. Such manifolds comprise a manifold structure, and at least one sorbent sheet material product affixed to the internal wall of an air intake manifold.

Additional Components

The invention may include sensors such as a fuel composition sensor. The fuel composition sensor may be used to detect the mixture of gasoline and ethanol or other fuel contained within the housing or air intake and the sorbent material, and this information may be communicated to the ECU so that vapors which are later released to the engine can be more precisely used during engine combustion. Other sensors include temperature sensors, vapor pressure sensors, oxygen sensors, and the like. The sensors can operate on principles of electrochemical interaction, electronic such as thermocouples, electromechanical, refractive index, infrared spectroscopy, and others depending on the type of information that is required for the ECU. The sensors can be included alone or in combination within the housing or air intake, or, if no housing is specified, within the area that contains the sorbent material sheets. The sensors can be included in holes or notches which are cut from the sheet, or in spaces between the sheets with the sheets wrapped or folded around the sensors.

Example 1

Air Intake Test

To demonstrate hydrocarbon adsorption advantages versus prior art products tests were carried out with butane as follows:

Test Setup:
  Air tight box contains injection port and port for butane detection sensor
  Sensor remains inside box during test and is zeroed out prior to starting test
  1.25 ml of butane is injected into the box using a syringe
  Sample is placed into the box once 1000 ppm level is detected
  Timer is started once test sample is placed in box
  Measurements are taken at 5 min intervals for first 30 minutes and then every 10 minutes, until end of test (120 minutes, or until 0ppm of butane is read).
  The test setup is illustrated in FIG. 5.

Figure 5:
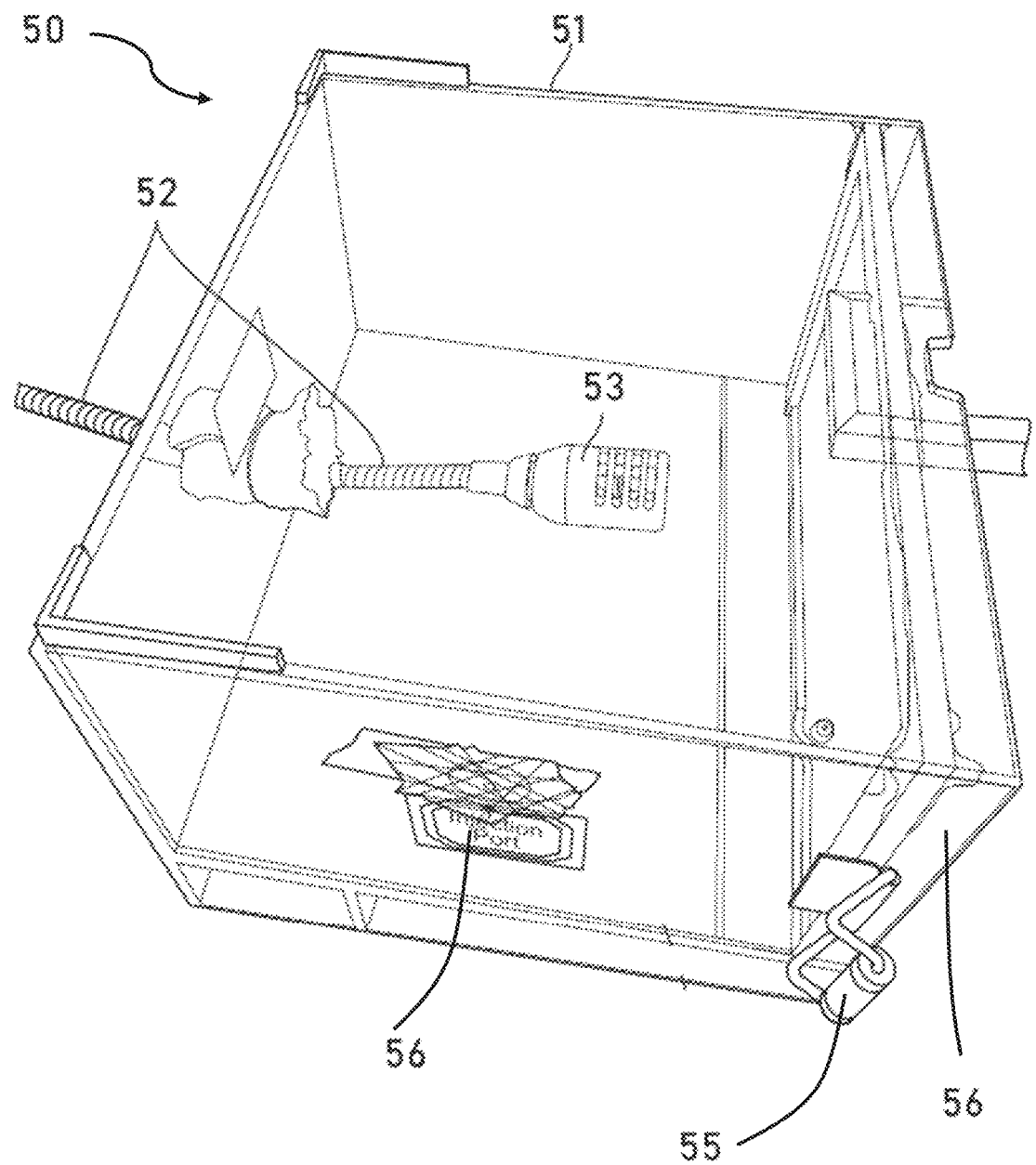
FIG. 5 depicts the test setup of an embodiment of the disclosure.

According to FIG. 5, a test apparatus 50 is depicted. The test apparatus 50 includes a clear acrylic box 51, one wall of which has a hole where sensor arm 52 is inserted with appropriate sealing and packing material to ensure that no gas can escape from the clear acrylic box 51. Inside the clear acrylic box 51, the sensor arm suspends a butane sensor 53 that detects the level of butane contained within the clear acrylic box 51. An injection port 56 is also present so that butane or other gases can be added. Samples (not shown) are placed inside the apparatus 50 by opening the door 54 by way of the handle 55.

The sorbent material sheets were formed by blending powdered activated carbon and a PTFE binder. The binder was blended in the amount of about 11 wt. %. The powdered activated carbon is available from Calgon Carbon Corporation by the product name "RB" and is a coal based activated carbon having a gravimetric iodine number of at least 1070 mg/g. Such sorbent material sheets were shown to reach non-detectable levels of butane more quickly than any other product tested as shown in the graph below. The results are detailed in FIG. 6.

Example 2

Determination of the Butane Activity of Activated Carbon Sheet from Hydrocarbon Adsorber (HCA)

Butane Activity (BA) is defined as the ratio (in %) of the mass of butane adsorbed by an activated carbon sample when the carbon is saturated with butane under conditions of the test method. The BA test can be used as a non-ozone depleting substitute for the CCI 4 No. test. A factor correlating the two tests is provided if it is required to convert BA to CCI4 No. Butane Working Capacity (BWC) is defined as the difference between the butane adsorbed at saturation and the butane retained per unit volume of carbon after a specified purge. This method is modeled after ASTM D5742 and ASTM D5228.

An activated carbon bed of known volume and mass is saturated with butane vapor. The mass adsorbed at saturation is measured and reported as mass of butane per unit mass of carbon on a percentage basis. The carbon bed is then purged under prescribed conditions with dry hydrocarbon free air. The loss of mass is the BWC and is expressed as mass of butane per unit area of carbon. The conditions of testing govern the adsorption of butane on activated carbon. Deviations from the method may result in varying butane values.

Test Setup:
  Samples should be cut from an HCA using the 3.5"×2.5" die-cutting tool. Strips of material cut from part are placed in an oven-ready tray. Then oven dried overnight at 105° C.
  Accurately weigh the empty, dry sample tube to the nearest 0.01 grams and record the tare weight
  Fill the column with the cut carbon strip samples
  Re-weigh the filled sample tube to the nearest 0.01 gram; record the weight of the carbon and the sample tube Calibrate the Butane Adsorption Apparatus. Set the Water Bath to maintain a temperature of 25±0.2° C. Regulate the flow of the butane so that it passes through the carbon bed at 250±5 mL/min. Periodically check the flow when the sample is being run Place the filled sample tube in the constant temperature bath, connect the butane delivery line to the tube and pass the butane down-flow through the carbon bed for a minimum of 20 minutes or until saturation is achieved Carefully remove the sample tube from the apparatus without disturbing the bed, wipe dry, and weigh to the nearest 0.01 grams After weighing the tube, place the tube with sample back in the constant temperature water bath and connect the air delivery line to the tube. Set the equipment to provide air down-flow through the carbon bed The rotameters are adjusted to purge the sample with dry air at a rate of 300±5 mL/min for 40 minutes ±20 seconds. The weight should be checked and recorded to the nearest 0.01 g every ten minutes during the purge cycle After purge time, turn off air, disconnect the tubing, install stoppers, remove the sample tube from the water bath and dry Weight the tube to the nearest 0.01 g and record the mass Example 3

ABC HCA Air Intake Box Butane/Purge Test

In this test

Test Setup for Butane Adsorption Cycle:

Record pre-oven dried mass of the sample using the analytical balance and oven dry at 105° C. for at least 3 hours or overnight Select air intake box for testing and set up in a test station Turn on butane and set flow to 0.442 liter per minute (L/min) using the flow meter Once flow rate has been set, attached butane hose line to the box Place pocket balance in the box with a standoff placed in the box and leave door to box open Remove sample from the oven and record mass using the analytical balance Place sample inside the box on top of standoff in the box Close the door and secure it shut Run test for 90 minutes Prior to removing the sample from the box at the end of the test, make sure that there is a zip-lock poly bag ready that has had its mass recorded At the end of 90 minutes, remove the sample from the box and immediately bag it Record mass of the sample inside the bag. Subtract the bag mass from the total mass to record the final mass after the test Test Setup for Air Purge Cycle:

Disconnect butane line from the box from the previous butane adsorption cycle

Turn on the air valve

Set air flow rate to 23.70 L/min

Connect air line to the box and use another air line to flow out the box of any residual butane Use the butane detection sensor to determine if there is no residual butane before removing the additional airline With the flow rate set, remove the butane loaded sample from the poly bag and place on top of the standoff in the box Shut the door to the box and secure it closed For the first 30 mins, remove the sample from the box and place on the analytical balance after every 5 minutes. After the first 30 mins, repeat the mass recording every 10 mins until 120-minute total test time has been achieved The last mass recording will serve as the final mass after the test At the completion of the test, if not preparing for additional tests, turn off balances and shut off any gas flow (butane and air)

Example 4

Figure 9:
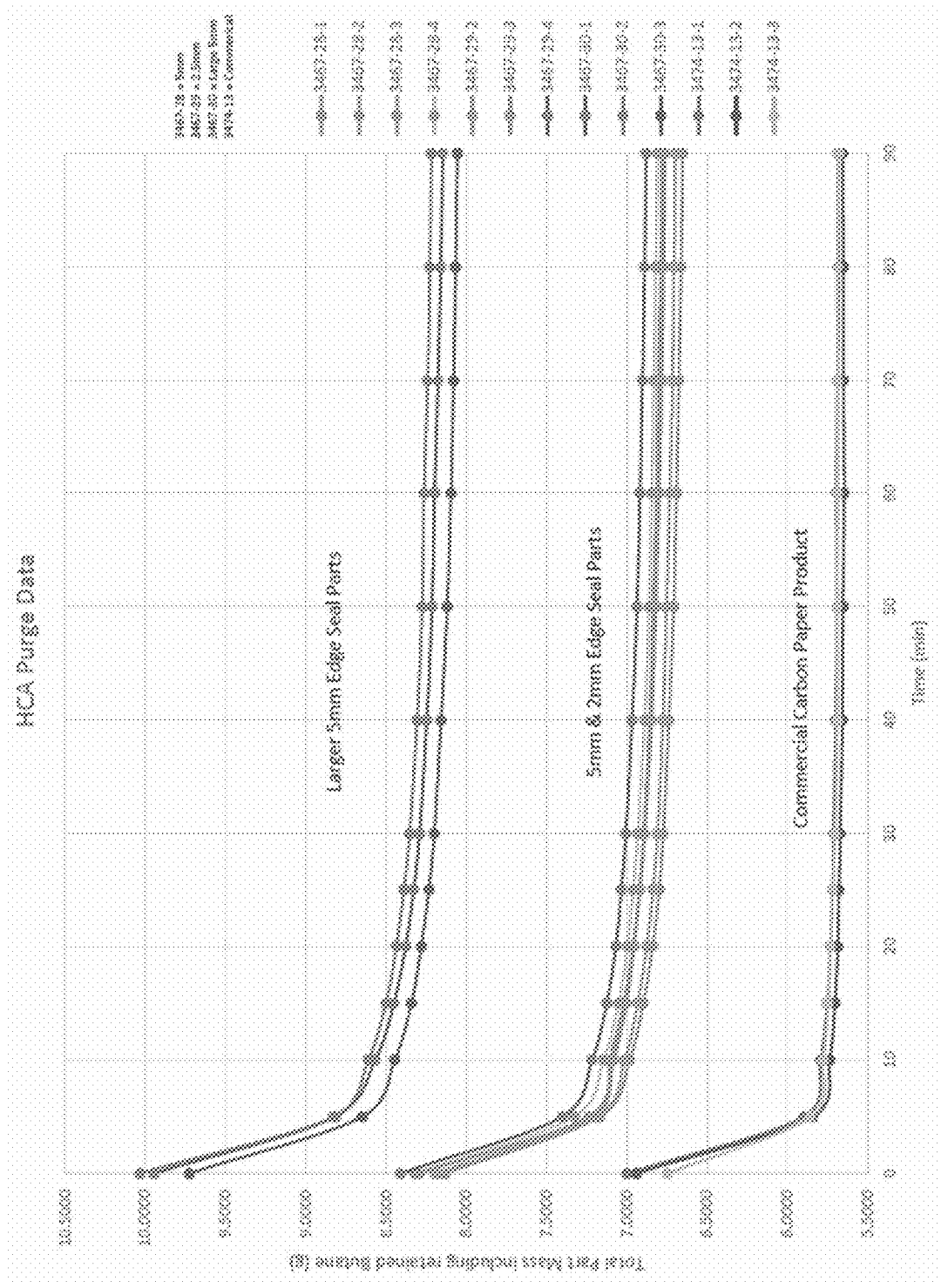
FIG. 9 depicts the test results of an embodiment of the disclosure.

Three groups of experimental examples were saturated with butane vapor and then purged to determine the overall butane working capacity of the sorbent material sheets, the effect of the edge seal in different sizes on the overall butane working capacity of the sorbent, and the relative performance of the sorbent material sheets in comparison to prior art carbon paper sheets that are conventionally used. The testing was performed in accordance with Example 3 above. Results of the test are shown in TABLE 1 below and FIG. 9 In TABLE 1, each row labeled "Sample" is actually the average value of multiple test runs, and the actual curves of each individual sample are shown in FIG. 9. In each of the tests, the overall sorbent material sheet products was the same size, but the depth of the edge seal was varied. The edge seal was around the entire perimeter of the sorbent material sheet product. Sample CCC_RD_0070 had a larger overall sheet size and therefore has a higher average butane adsorption result than CCC_RD_0068 and CCC_RD_0069. The samples CCC_RD_0068 and CCC_RD_0069 were compared to a commercially available carbon paper of the same size that is commonly used in air intake evaporative adsorption applications. The sorbent material sheet products of the three inventive samples were formed from a blend of RB powdered activated carbon in the amount of 89 wt. %, and an 11 wt. % total amount of a PTFE binder with nonwoven polypropylene fibers.

TABLE 1

| Sample | Edge Seal Width (mm) | Avg. Butane Adsorption (g) |
|---|---|---|
| CCC_RD_0068 | 5 | 1.638 |
| CCC_RD_0069 | 2.5 | 1.663 |
| CCC_RD_0070 | 5 (larger overall sheet surface area than other samples) | 1.890 |
| Carbon Paper (Prior Art) | 0 | 1.278 |

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art all language such as "up to," "at least," and the like include the number recited and refer to ranges that can be subsequently broken down into subranges as discussed above. Finally, as will be understood by one skilled in the art, a range includes each individual member. Thus, for example, a group having 1-3 materials refers to groups having 1, 2, or 3 materials. Similarly, a group having 1-5 materials refers to groups having 1, 2, 3, 4, or 5 materials, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A vapor adsorbing air intake comprising:
   an air intake defining an internal wall surface; and
   a sorbent material sheet product that includes a sorbent material sheet and at least one porous cover layer, wherein the sorbent material sheet product is located and positioned along the internal wall surface for interaction with vapors in close proximity thereto, wherein the sorbent material sheet product has a void volume of about 10% to about 35%, and
   wherein the sorbent material sheet comprises a first sorbent having a first butane working capacity (BWC) and a second sorbent having a second BWC, wherein the first BWC is greater than the second BWC.

2. The vapor adsorbing air intake of claim 1, wherein the sorbent material includes a carbonaceous material.

3. The vapor adsorbing air intake of claim 2, wherein the carbonaceous material is selected from the group consisting of activated carbon, reactivated carbon, carbon nanotubes, graphenes, and combinations thereof.

4. The vapor adsorbing air intake of claim 2, wherein the carbonaceous material is activated carbon or reactivated carbon.

5. The vapor adsorbing air intake of claim 1, wherein the sorbent material sheet comprises a sorbent material and a binder, wherein the binder comprises a polytetrafluoroethylene (PTFE or TEFLON), a polyvinylidene fluoride ($PVF_2$ or PVDF), an ethylene-propylene-diene (EPDM) rubber, a polyethylene oxide (PEO), a UV curable acrylate, a UV curable methacrylate, a heat curable divinyl ether, polybutylene terephthalate, acetal or polyoxymethylene resin, a fluoroelastomer, a perfluoroelastomer (FFKM) and/or a tetrafluoro ethylene/propylene rubber (FEPM), an aramid polymer, a para-aramid polymer, a meta-aramid polymer, poly trimethylene terephthalate, an ethylene acrylic elastomer, polyimide, a polyamide-imide, a polyurethane, low density and high density polyethylene, polypropylene, biaxially oriented polypropylene (BoPP), polyethylene terephthalate (PET), biaxially oriented polyethylene terephthalate (BoPET), polychloroprene, or copolymers or combinations thereof.

6. The vapor adsorbing air intake of claim 1, wherein each of the at least one porous cover layer comprises a polytetrafluoroethylene (PTFE or TEFLON), a polyvinylidene fluoride ($PVF_2$ or PVDF), an ethylene-propylene-diene (EPDM) rubber, a polyethylene oxide (PEO), a UV curable acrylate, a UV curable methacrylate, a heat curable divinyl ether, polybutylene terephthalate, acetal or polyoxymethylene resin, a fluoroelastomer, a perfluoroelastomer (FFKM) and/or a tetrafluoro ethylene/propylene rubber (FEPM), an aramid polymer, a para-aramid polymer, a meta-aramid polymer, poly trimethylene terephthalate, an ethylene acrylic elastomer, polyimide, a polyamide-imide, a polyurethane, low density and high density polyethylene, polypropylene, biaxially oriented polypropylene (BoPP), polyethylene terephthalate (PET), biaxially oriented polyethylene terephthalate (BoPET), polychloroprene, or copolymers or combinations thereof.

7. The vapor adsorbing air intake of claim 1, wherein the porous cover layer is in the form of non-woven fibers.

8. The vapor adsorbing air intake of claim 1, wherein the vapor adsorbing air intake is at least one of an air filter box or air filter housing, an air intake tube, a mass air flow sensor, a throttle body, an air intake manifold, an air intake runner that is connected to an individual cylinder or combustion chamber, or an air intake runner that is connected to multiple cylinders or combustion chambers.

9. The vapor adsorbing air intake of claim 1, wherein the sorbent material sheet has an edge seal that is disposed on one or more of a perimeter of the sorbent material sheet or proximal to an attachment of the sorbent material sheet to the internal wall surface of the air intake.

10. The vapor adsorbing air intake of claim 9, wherein the edge seal has an edge seal width of about 1 mm to about 10 mm.

11. The vapor adsorbing air intake of claim 9, wherein the edge seal has an edge seal width of about 2.5 mm to about 5 mm.

12. The vapor adsorbing air intake of claim 9, wherein the edge seal is formed by, on one or more portions of the one or more porous cover layer, at least one of localized heating by infrared radiation, ultrasonic vibration, or contact with a heated tool, localized curing or localized crosslinking by ultraviolet radiation or oxidizing or free radical compounds, localized application of adhesive or binder, or mechanical fastening by at least one of stitches, folds, staples, or clamps.

13. A sorbent material sheet product comprising:
at least one sorbent material sheet and at least one porous cover layer that is disposed on the at least one sorbent material sheet,
wherein the sorbent material sheet product has an edge seal disposed on one or more of a perimeter of the sorbent material sheet or proximal to an attachment for attaching the sorbent material sheet to the internal wall surface of a vapor adsorbing air intake,
wherein the sorbent material sheet product has a void volume of about 10% to about 35%, and
wherein the sorbent material sheet comprises a first sorbent having a first butane working capacity (BWC) and a second sorbent having a second BWC, wherein the first BWC is greater than the second BWC.

14. The sorbent material sheet product of claim 13, wherein the edge seal has an edge seal width of about 1 mm to about 10 mm.

15. The sorbent material sheet product of claim 13, wherein the edge seal has an edge seal width of about 2.5 mm to about 5 mm.

16. A method of making a sorbent material sheet product, the method comprising:
blending a binder and a sorbent material;
forming at least one sorbent material sheet from the blend of the binder and the sorbent material;
stacking, rolling, winding, folding, and/or laminating the at least one sorbent material sheet such that the sorbent material sheet product has a void volume of about 10% to about 35%;
providing an attachment on the sorbent material sheet for attaching the sorbent material sheet to an internal wall surface of a vapor adsorbing air intake;
providing a porous cover layer on the at least one sorbent material sheet; and
forming an edge seal that is disposed on one or more of a perimeter of the sorbent material sheet product or is proximal to an attachment for attaching the sorbent material sheet to the internal wall surface of a vapor adsorbing air intake,
wherein the at least one sorbent material sheet comprises a first sorbent having a first butane working capacity (BWC) and a second sorbent having a second BWC, wherein the first BWC is greater than the second BWC.

17. The method of claim 16, wherein forming the edge seal comprises one or more of the following:
localized heating of the sorbent material sheet product using infrared radiation, ultrasonic vibration, or contact with a heated tool;
localized curing or localized crosslinking of the sorbent material sheet product using ultraviolet radiation or oxidizing or free radical compounds;
applying adhesive, binder, tackifier, or primer to the sorbent material sheet product in a localized manner; and
mechanically fastening the sorbent material sheet product using at least one of stitches, folds, staples, or clamps.

18. A method of capturing vapors in a vapor adsorbing air intake, the method comprising:
providing an air intake defining an internal wall surface and a sorbent material sheet product that includes a sorbent material sheet and at least one porous cover layer located and positioned along the internal wall surface; and permitting vapors to contact the sorbent material sheet product and thereby be adsorbed by the sorbent material sheet product, wherein the sorbent material sheet product has a void volume of about 10% to about 35%, and wherein the sorbent material sheet comprises a first sorbent having a first butane working capacity (BWC) and a second sorbent having a second BWC, wherein the first BWC is greater than the second BWC.

19. The method of claim 18, further comprising desorbing the vapors that were previously adsorbed by the sorbent material sheet product by contacting the sorbent material sheet product with a purging gas.

20. A vapor adsorbing air intake comprising:

an air intake defining an internal wall surface; and a sorbent material sheet that includes a sorbent material and a binder, wherein the binder comprises one or more of a polytetrafluoroethylene (PTFE or TEFLON), a polyvinylidene fluoride ($PVF_2$ or PVDF), an ethylene-propylene-diene (EPDM) rubber, a polyethylene oxide (PEO), a UV curable acrylate, a UV curable methacrylate, a heat curable divinyl ether, polybutylene terephthalate, acetal or polyoxymethylene resin, a fluoroelastomer, a perfluoroelastomer (FFKM) and/or a tetrafluoro ethylene/propylene rubber (FEPM), an aramid polymer, a para-aramid polymer, a meta-aramid polymer, poly trimethylene terephthalate, an ethylene acrylic elastomer, polyimide, a polyamide-imide, a polyurethane, low density and high density polyethylene, polypropylene, biaxially oriented polypropylene (BoPP), polyethylene terephthalate (PET), biaxially oriented polyethylene terephthalate (BoPET), polychloroprene, or copolymers or combinations thereof, wherein the sorbent material sheet is located and positioned along the internal wall surface for interaction with vapors in close proximity thereto, wherein the sorbent material sheet has been stacked, rolled, wound, folded, and/or laminated to have a void volume of about 10% to about 35%, and wherein the sorbent material sheet comprises a first sorbent having a first butane working capacity (BWC) and a second sorbent having a second BWC, wherein the first BWC is greater than the second BWC.

* * * * *